(12) United States Patent
Prejzek

(10) Patent No.: US 6,640,029 B1
(45) Date of Patent: Oct. 28, 2003

(54) LIGHT OPTICAL SYSTEM, ESPECIALLY FOR INFORMATION, ADVERTISING ILLUMINATION OR DECORATIVE PURPOSES

(75) Inventor: Václav Prejzek, Prague (CZ)

(73) Assignee: Eclair, Spol S R.O., Prague (CZ)

( * ) Notice: Subject to any disclaimer, the term of this patent is extended or adjusted under 35 U.S.C. 154(b) by 0 days.

(21) Appl. No.: 09/762,879

(22) PCT Filed: Aug. 10, 1999

(86) PCT No.: PCT/CZ99/00029

§ 371 (c)(1),
(2), (4) Date: Feb. 12, 2001

(87) PCT Pub. No.: WO00/09942

PCT Pub. Date: Feb. 24, 2000

(30) Foreign Application Priority Data

| Aug. 14, 1998 | (CZ) | ............................................. | 2572-98 |
| May 13, 1999 | (CZ) | ............................................. | 1712-99 |
| May 13, 1999 | (CZ) | ............................................. | 1713-99 |
| Jul. 14, 1999 | (CZ) | ............................................. | 2501-99 |

(51) Int. Cl.[7] ................................................ G02B 6/34
(52) U.S. Cl. ........................... 385/36; 385/14; 385/129; 385/31
(58) Field of Search ............................ 385/31, 36, 131, 385/146, 901, 14, 49, 129, 130; 362/297, 298, 299, 308, 328, 346, 31, 330, 558

(56) References Cited

U.S. PATENT DOCUMENTS

| 3,614,198 | A | * | 10/1971 | Martin et al. | ................. | 385/129 |
| 4,548,464 | A | * | 10/1985 | Auracher et al. | .............. | 385/14 |
| 4,662,716 | A | * | 5/1987 | Matsumura et al. | ......... | 359/636 |
| 4,877,301 | A | * | 10/1989 | Yokomori et al. | ........... | 385/130 |
| 5,208,800 | A | * | 5/1993 | Isobe et al. | .................... | 385/14 |
| 5,303,322 | A | * | 4/1994 | Winston et al. | ............. | 385/146 |
| 5,420,947 | A | * | 5/1995 | Li et al. | ...................... | 385/129 |
| 5,444,567 | A | * | 8/1995 | Kataoka | ..................... | 385/129 |
| 5,471,440 | A | * | 11/1995 | Isobe | .......................... | 385/14 |
| 5,555,329 | A | * | 9/1996 | Kuper et al. | .................. | 385/36 |
| 5,579,429 | A | * | 11/1996 | Naum | ......................... | 385/143 |
| 5,668,913 | A | * | 9/1997 | Tai et al. | ..................... | 385/146 |
| 5,854,872 | A | * | 12/1998 | Tai | .............................. | 385/133 |
| 5,890,796 | A | * | 4/1999 | Marinelli et al. | ............ | 362/307 |
| 5,921,652 | A | * | 7/1999 | Parker et al. | .................. | 362/31 |
| 6,039,452 | A | * | 3/2000 | Iimura | ......................... | 362/31 |
| 6,185,015 | B1 | * | 2/2001 | Reinhorn et al. | .............. | 385/14 |

FOREIGN PATENT DOCUMENTS

| WO | WO 95/34009 | 12/1995 |
| WO | WO 96/23166 | 8/1996 |
| WO | WO 98/15862 | 4/1998 |

* cited by examiner

Primary Examiner—Michael P. Stafira
Assistant Examiner—Juan D Valentin, II
(74) Attorney, Agent, or Firm—Brown & Michaels, PC

(57) ABSTRACT

An illuminated display and illuminator for illuminating a planar light conductor with a light source. The illuminator has an injector comprising a wedge-shaped body made of transparent material having a refractive index higher than air, the optical interface between the injector and the light conductor being optically homogeneous. The input side of the injector is shaped such that light entering the injector through the input side is brought into focus at a point inside the planar light conductor or behind it. The illuminator also has a light guide located in an optical path between the light source and the input side of the injector, such that light is guided by the lightguide from the light source to the injector; and into the planar light conductor through the optically homogeneous optical interface, and is distributed through the planar light conductor by internal reflection within the body of the planar light conductor.

25 Claims, 26 Drawing Sheets

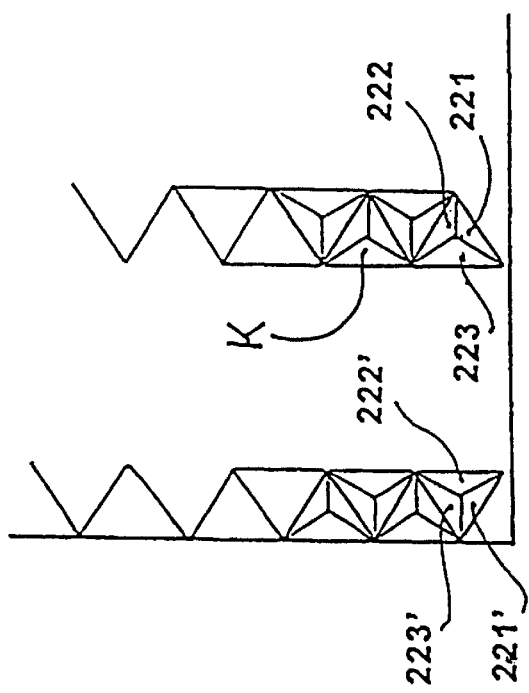
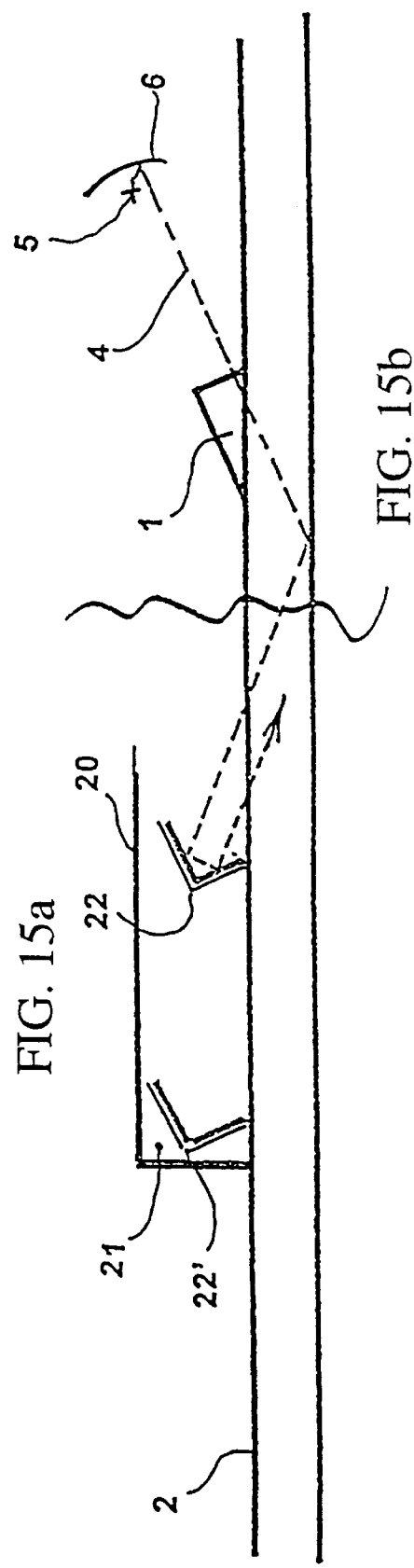
FIG. 15a
FIG. 15b

LIGHT OPTICAL SYSTEM, ESPECIALLY FOR INFORMATION, ADVERTISING ILLUMINATION OR DECORATIVE PURPOSES

FIELD OF THE INVENTION

The invention relates to the light optical system, especially for information, advertising, illumination or decorative purposes, that consists of at least one light source and at least one light conductor.

DESCRIPTION OF THE PRIOR ART

The so far known light informative and illumination devices are arranged e.g. that way that the light source is located inside the said device. Such a way e.g. indicators, company shields, street lamps, and other objects are arranged, based on the light translucence. The drawback of such an arrangement is the fact that dimensions and shape of such devices are determined by the configuration of the light source used. Another, so far used method of informative and advertising devices construction is based on the principle of light guidance within a light conductor, e.g. in a lightguiding plate into which the light is introduced sideways, i.e. through one of its side rims, and it is conducted inside in the mode of absolute reflection. From the light conductor, the light gets off having reflected from the interface between light conductor and a target object. Light rays having reflection angle there that does not meet total reflection condition compose the image to the viewer of the target object that is located inside the light conductor or on its surface. The light conductor can be e.g. plate of organic substance, glass or a material of similar qualities. The light source that is usually a luminescent source of cold light is located along the side rim of the light conductor. With respect to the fact that the light source is an intrinsic part of the device and takes part on its appearance it is usually not possible to provide it with an effective reflector. The rays get off of such a source in all directions and a small amount of them cuts the light conductor side rim. And again, only a small amount of these has the direction meeting the condition necessary for entering the light conductor under the angle that secures light guidance in the mode of absolute reflection. The drawback of such a construction is that only a small amount of light rays that progress along the light conductor in the mode of absolute reflection come to the target object and compose an image. The other rays get absorbed by the device or leave it missing the target.

With respect to the above mentioned facts, the efficiency of so far known optical systems is low, such systems are used marginally as complements to another information systems only.

The aim of the invention is to improve the efficiency of the above described systems, at least to such a degree ensuring that these systems could be used for information, advertising, decorative or illumination purposes to a wide extent.

SUMMARY OF THE INVENTION

The above mentioned drawbacks do not occur with the light optical system especially for information, advertising, illumination or decorative purposes, that consists of at least one light source and at least one light conductor, especially lightguiding plate or lightguiding fibre, whose principle consists in the fact that it contains at least one optical element of the following set:

i) input element for the compression and/or rectification of light lead to the light conductor, that consists of a compression element and/or light conductor and located between a light source and an injector element that is an injector having input area, ii) injector element for light introduction from the light source into the light conductor, consisting of at least one injector determined by the input area that projects out from the main surface of the light conductor wherein the surface lines of the injector input area contain an angle α bigger than 0° and equal or smaller than 90° with the main surface of the light conductor, secondary area that contain an angle β bigger than 0° and smaller than 180° with the input area, and a basis area that is identical with a part of the main surface of the light conductor, iii) emiter element serving for the output of the light progressing through the light conductor from its main surface, that is composed of at least one emiter determined by its output area that projects out from the main surface of the light conductor wherein the surface lines of the emiter output area contain an angle α' bigger than 0° and equal or smaller than 90° with the main surface of the light conductor, secondary area that contains an angle β' bigger than 0° and smaller than 180° with the output area, and a basis area that is identical with a part of the main surface (P) of the light conductor, iv) reflecting emiter element serving for the output of the light coming along the light conductor from its main surface, that is composed of at least one reflecting emiter composed of solid lightguiding material having refraction index higher than that of the air, that is determined by free surfaces and the base area that is identical with a part of the main surface of the light conductor, and located on the main surface of the light conductor in the section of the light conductor marked out for the guidance of the light beam wherein at least one reflecting-diffusive area is a part of the reflecting element and the interface between reflecting emiter and light conductor is optically homogeneous with the reflecting emiter and the light conductor, v) reversing element for reversing the direction of the light travelling along light conductor, that consists of at least one reversing zone having at least one reflecting surface that projects out from the main surface of the light conductor wherein the surface lines of the reflecting surface contain an angle α″ bigger than 0° and smaller than 90° with the main surface of the light conductor, and vi) reflector element for modification the direction of the light travelling along light conductor by at least one mirror that projects out from the main surface of the light conductor wherein the mirror consists of gradually flecting surface having initial angle α‴ between reflecting element mirror and light conductor main surface that is smaller than or equal to 45°.

It is advantageous to insert an input element between the light source and the injector that consists of a compression element and/or light conductor the output area of which corresponds to the injector size and position wherein in case of the system composed of compression element, light conductor and injector, the light conductor is placed between the compression element output area and the injector input area.

One implementation of a light optical system according to the invention is characterised by the lay-out wherein the input area of an injector composed of a solid lightguiding material having refraction index higher than that of the air projects out of the light conductor main surface outwards the light conductor wherein the interface between injector and light conductor is optically homogeneous with the injector and the light conductor.

Another implementation of a light optical system according to the invention is characterised by the lay-out wherein the input area of an injector projects out of the main surface of the light conductor inwards the light conductor.

Another implementation of a light optical system according to the invention is characterised by the lay-out wherein the output area of an emiter composed of a solid lightguiding material having refraction index higher than that of the air projects out of the main surface of the light conductor outwards the light conductor wherein the interface between emiter and light conductor is optically homogeneous with the emiter and the light conductor.

Another implementation of a light optical system according to the invention is characterised by the lay-out wherein the emiter output area projects out of the main surface of the light conductor inwards the light conductor wherein it contains an angle $\alpha'$ bigger than 0° and smaller than or equal to 90° with the main surface of the light conductor.

Another implementation of a light optical system according to the invention is characterised by the lay-out wherein the reversing element is composed of a reversing zone in the form of lightguiding structure made of material having refraction index near to that of the light conductor that is connected to the light conductor though a joint optically homogeneous with the reversing zone and the light conductor wherein the reversing zone contains at least one reflecting surface.

Another implementation of a light optical system according to the invention is characterised by the lay-out wherein the reversing element is composed of a reversing zone containing at least one reflecting surface projecting out of the main surface of the light conductor inwards the light conductor wherein it contains an angle $\alpha''$ bigger than 0° and smaller than 90° with the main surface of the light conductor and at least one secondary area connecting the rim of the reflecting surface of the reversing area with the rim of the neighbouring reflecting surface of the reversing zone or with the beginning of the continuing main surface of the light conductor.

In the following description, the a.m. implementations of the light optical system according to the invention as well as other advantageous implementations of this system falling into the scope of the invention, as well as the advantages that can be achieved by using such implementations of the invention.

Under the notion "main surface of the light conductor", any surface of the light conductor should be understood that stretches basically in parallel with the direction of the light guidance in the light conductor. The remaining surface of the light conductor is composed of conductor parts denoted here as "conductor side rim" and does not fall in the scope of the notion "main surface of the conductor". With the lightguiding plate, the main surfaces are the both opposite large surfaces the distance of which is equal to the thickness of the plate whilst the side rims are the side lengthwise circumference areas having originated e.g. through cutting the plate out of a big format lightguiding material plate. With the lightguiding fibre, the main surface is its cylindric wall whilst its side rims are the round areas having originated through cutting the fibre from a longer piece.

In case of input and output area of an injector or an emiter projecting out of the main surface of the light conductor inwards the light conductor, it is necessary under the notion "angles containing a.m. areas and light conductor main surface" to understand the angles containing these areas and the fictitious surface of the light conductor (as drawn in the figures by dashed lines) that fluently links to neighbouring real main surface of the light conductor.

DESCRIPTION OF THE DRAWINGS

On the drawings attached:

FIG. 15a shows a reversing zone, FIG. 15b shows a reversing zone having reflecting surface composed of three mirrors.

DETAILED DESCRIPTION

Figure 1:
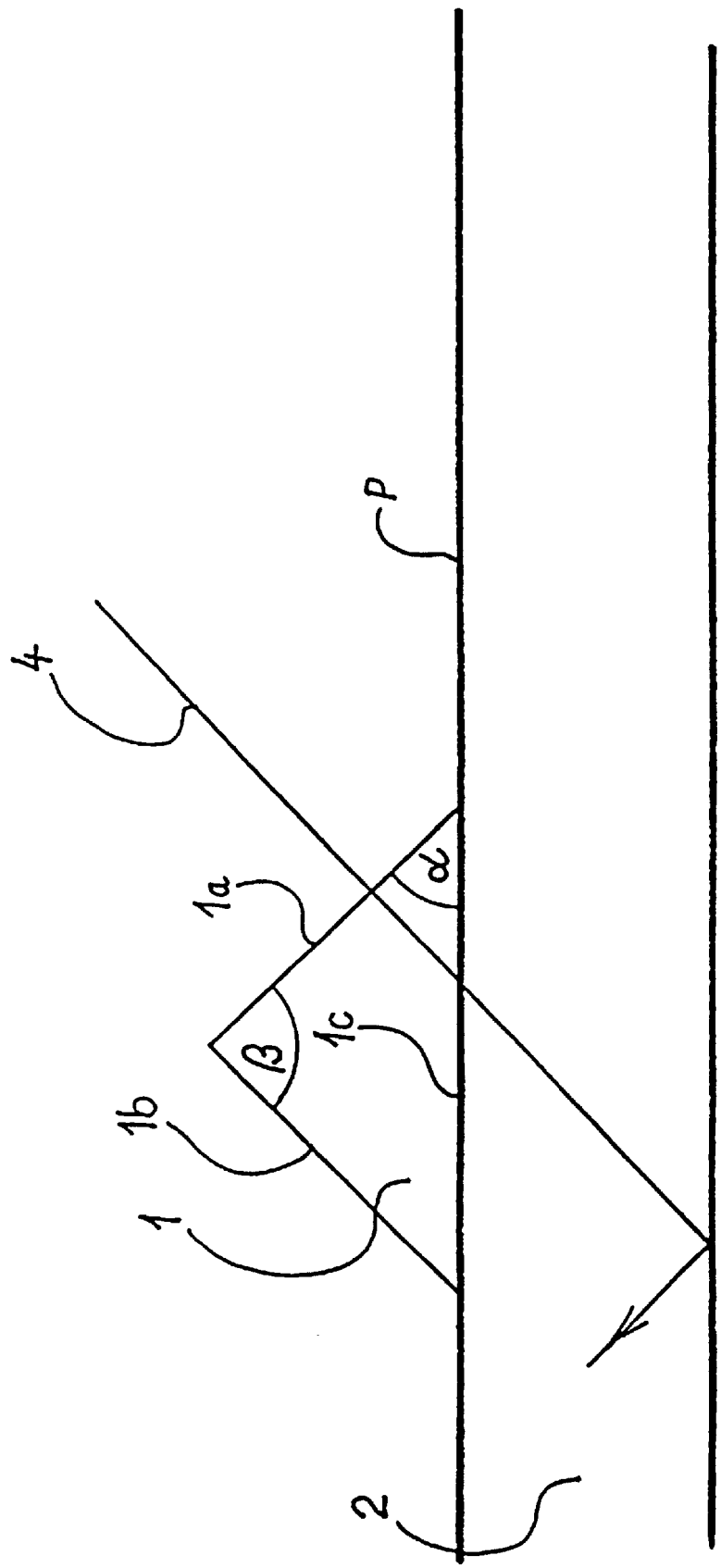
FIG. 1 shows the basic implementation of the injector according to the invention.

In FIG. 1, the basic arrangement of the light optical system according to the invention is described schematically that comprises light conductor 2, on which the injector 1 is placed with the input area 1a at which the light beam 4 falls is shown. Injector 1 is made of lightguiding material having refraction index higher than that of the air. Input area 1a of the injector 1 contains an angle bigger than 0° and smaller than, or equal to, 90°, with the main surface P. Interface between injector 1 and light conductor 2 is optically homogeneous. The advantage of using injector 1 is the possibility of light input into the conductor 2 through its main surface P without necessity of access to the side rim of the conductor 2.

Figure 2:
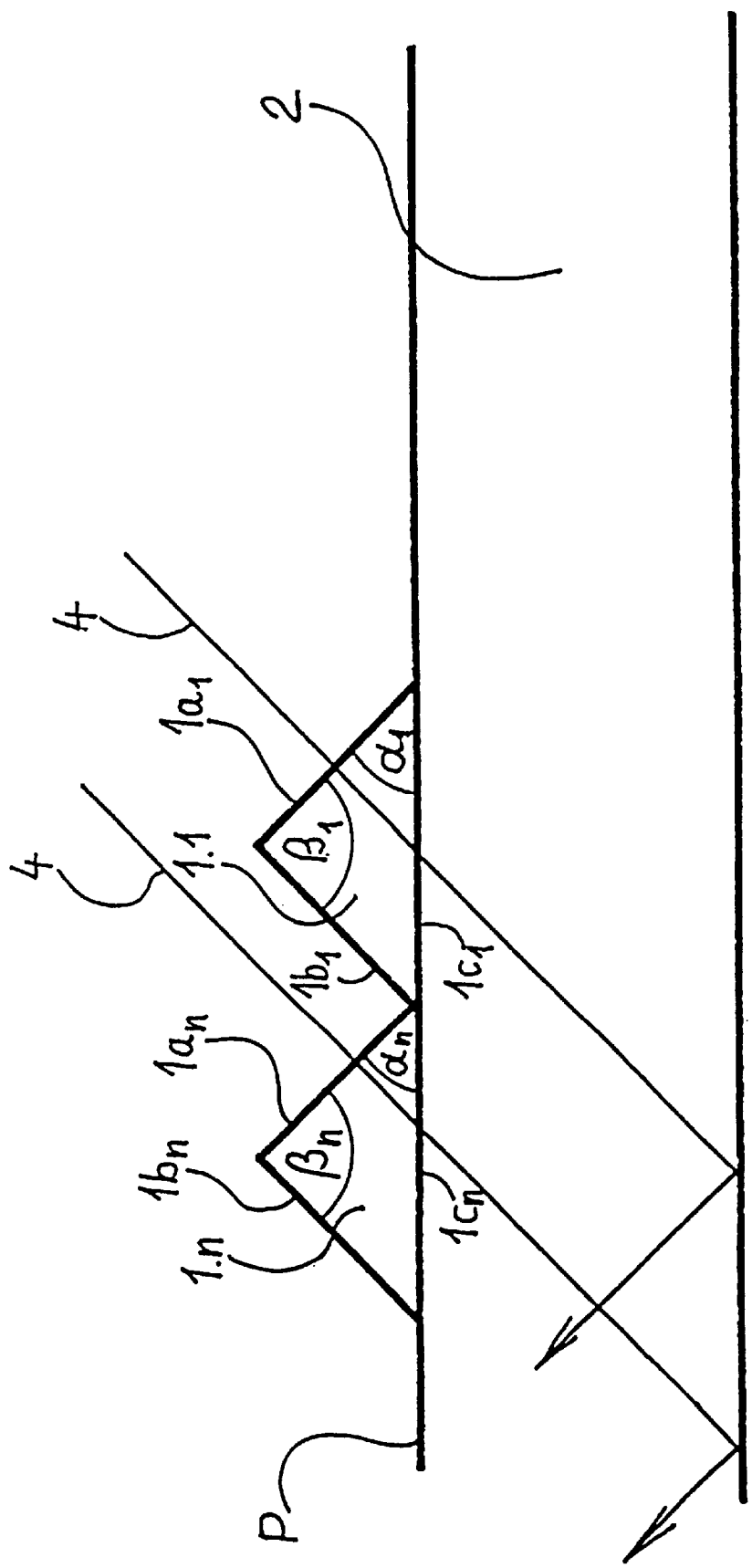
FIG. 2 shows two adjacent injectors at the light conductor main surface.

In FIG. 2, the arrangement with two injectors 1 in the main surface P with input areas $1a_1$, through $1a_n$ at which light beams 4 fall is shown. The advantage of this implementation is lower space requirement of the injector 1 that can range on the surface of the conductor 2 in the form of multiple miniature individual injectors 1.

Figure 3:
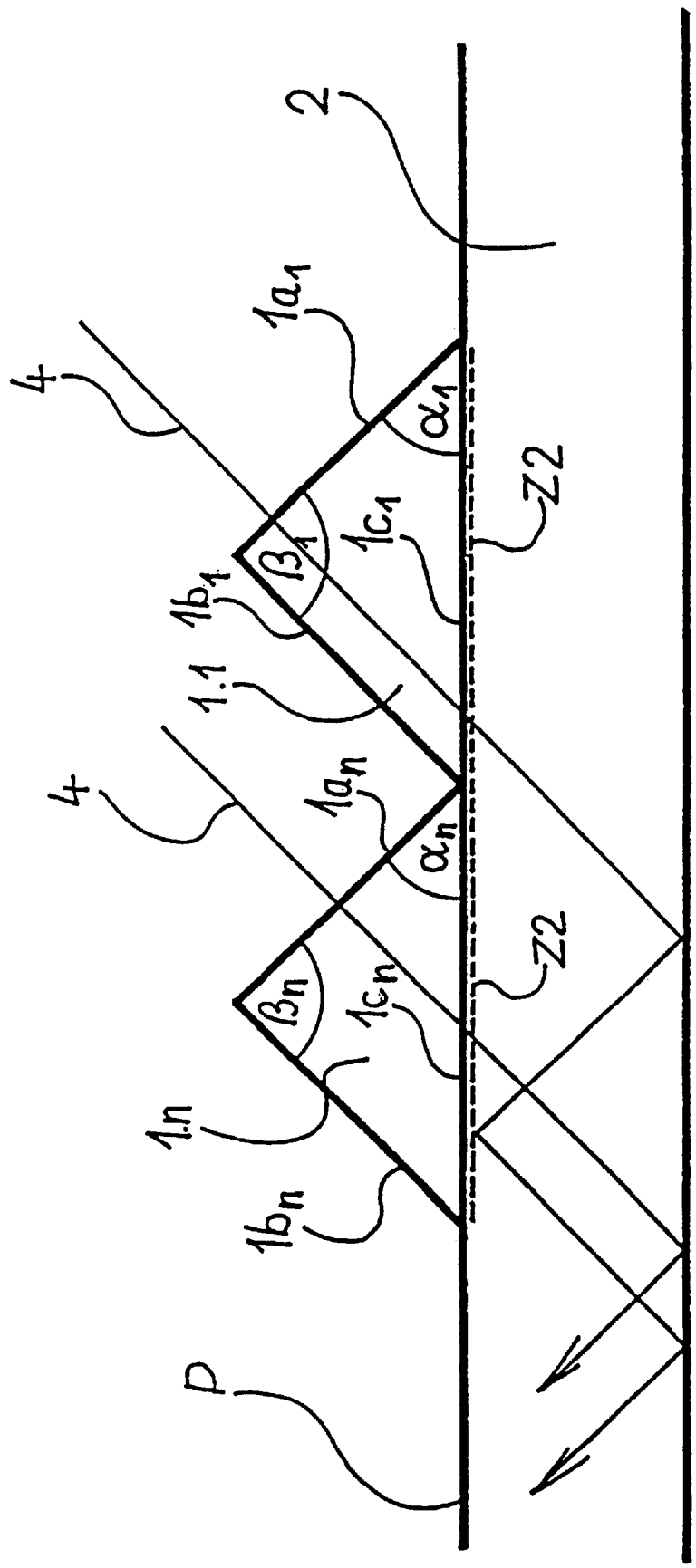
FIG. 3 shows the same implementation of the two adjacent injectors wherein the injectors are equipped with semi-permeable mirror at the interface between injector and light conductor.

Using injector 1 repeatedly it can happen that one of individual injectors $1._1$, $1._n$ occupies the space on the light conductor 2 where it should come to total reflection of another rays back to the light conductor 2. If the interface here is equipped with a semi.permeable mirror Z2 then the reflection of rays that entered the light conductor 2 through the injector $1._1$ back to the light conductor 2 is ensured even in the place where another rays 4 enter the light conductor 2 through the local injector $1._n$. This example is shown in the FIG. 3. The advantage of this arrangement is that the possible area can be extended for the injector 1 placing without losing light by its output through the injector 1 area.

Figure 4:
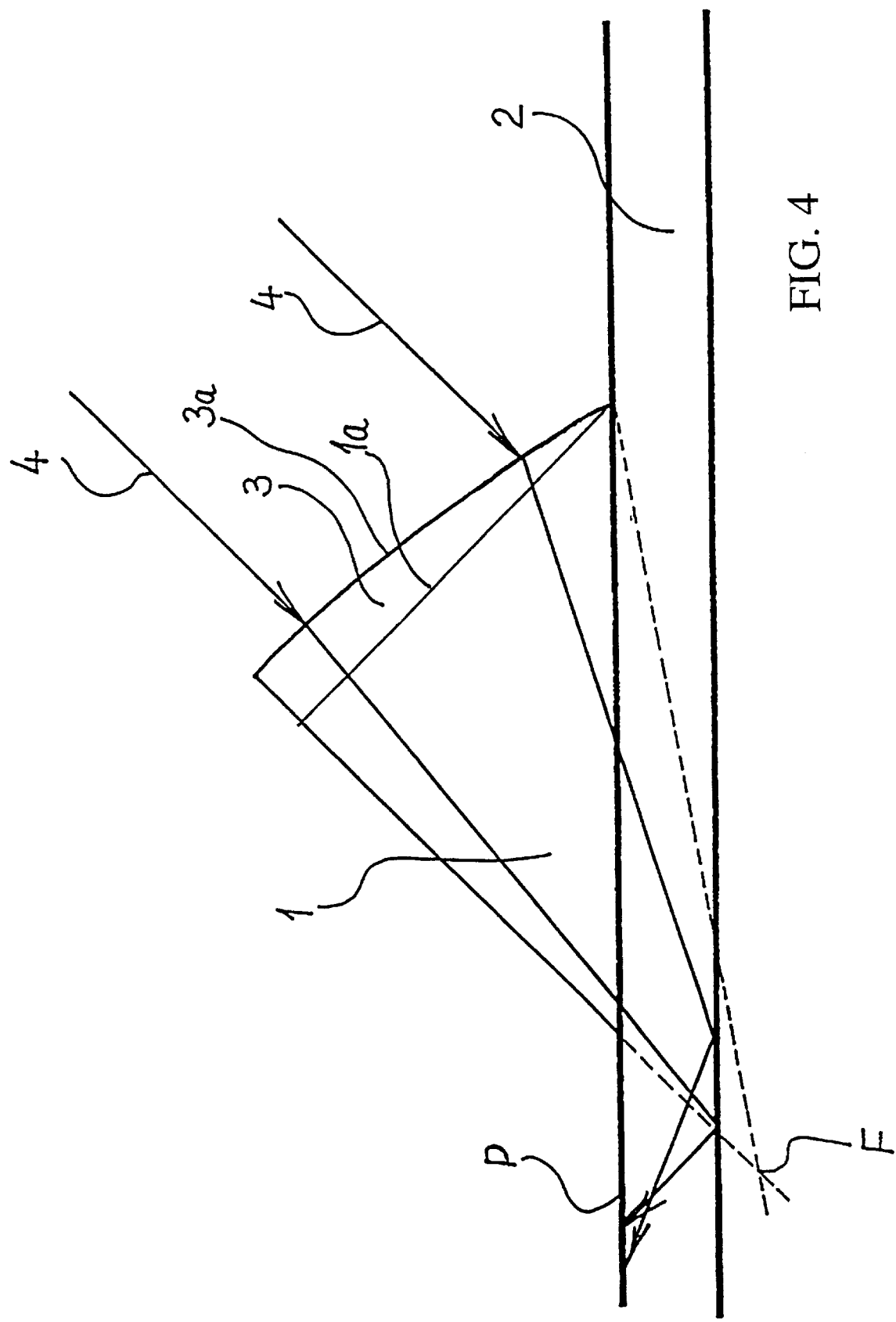
FIG. 4 shows an injector furnished with an optical element at its input area.

In FIG. 4 the example corresponding to the basic arrangement of FIG. 1 is shown with the difference that the injector 1 is completed on its input area 1a by the optical element 3 made of dielectric material. The input area of the optical element 3 is shaped so as light rays 4 having passed through this input area of the optical element refract e.g. into focus F that lies inside of the light conductor or behind it in the direction of ray beam impact. The advantage of this arrangement is that the possible area can be extended for the injector 1 placing without losing light by its output through the injector 1 area. A similar result can be achieved by a non-rotary or flat input area of the optical element 3.

Figure 4A:
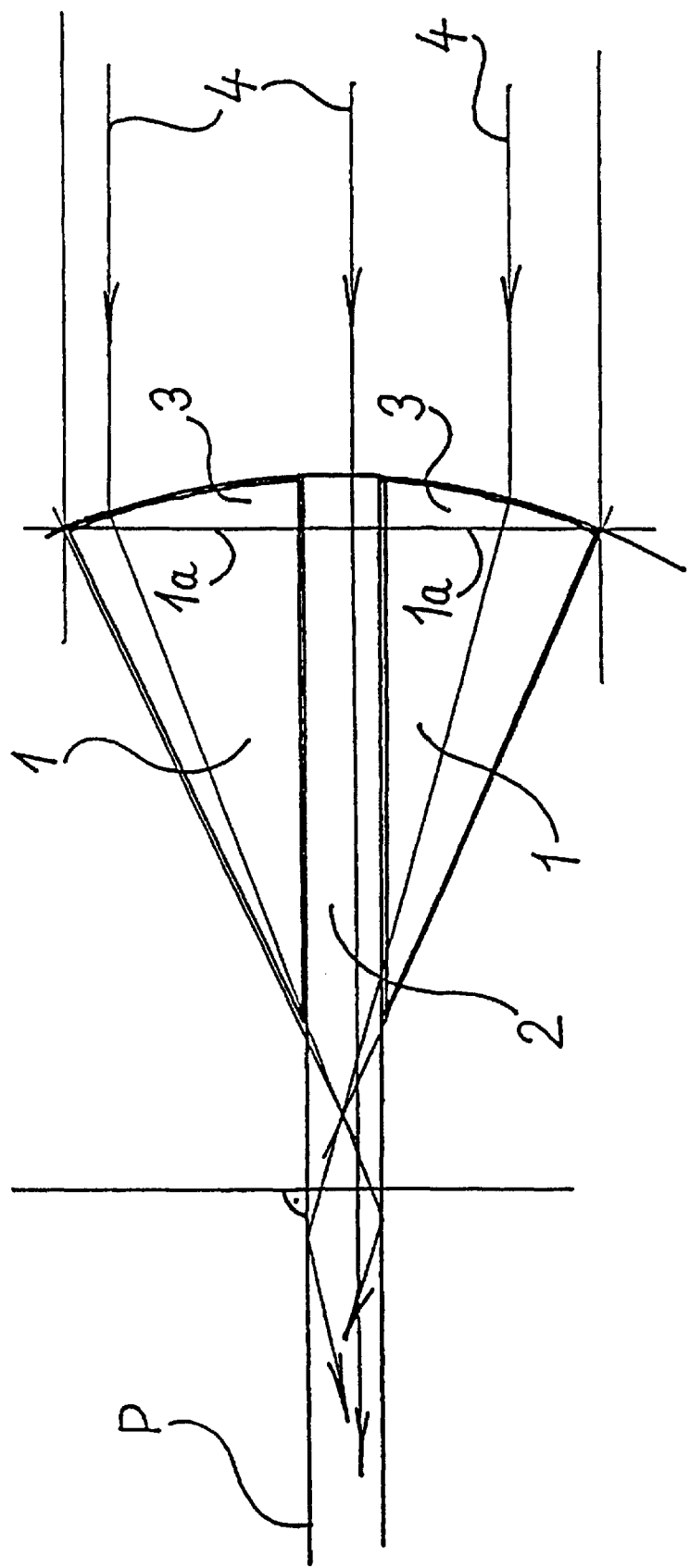
FIG. 4a shows an injector that bounds on the side rim of a light conductor.

In FIG. 4a the injector bounds on the side rim of the conductor 2. The advantage of this arrangement that is suitable for any shape of the conductor 2 incl. rotary one is the participation of the main surface P in the light 4 input into the conductor 2 and the possibility to insert more energy to the conductor through a substantially larger interface. This possibility increases significantly the efficiency of the systems leading the light through the light conductor 2.

Figure 5:
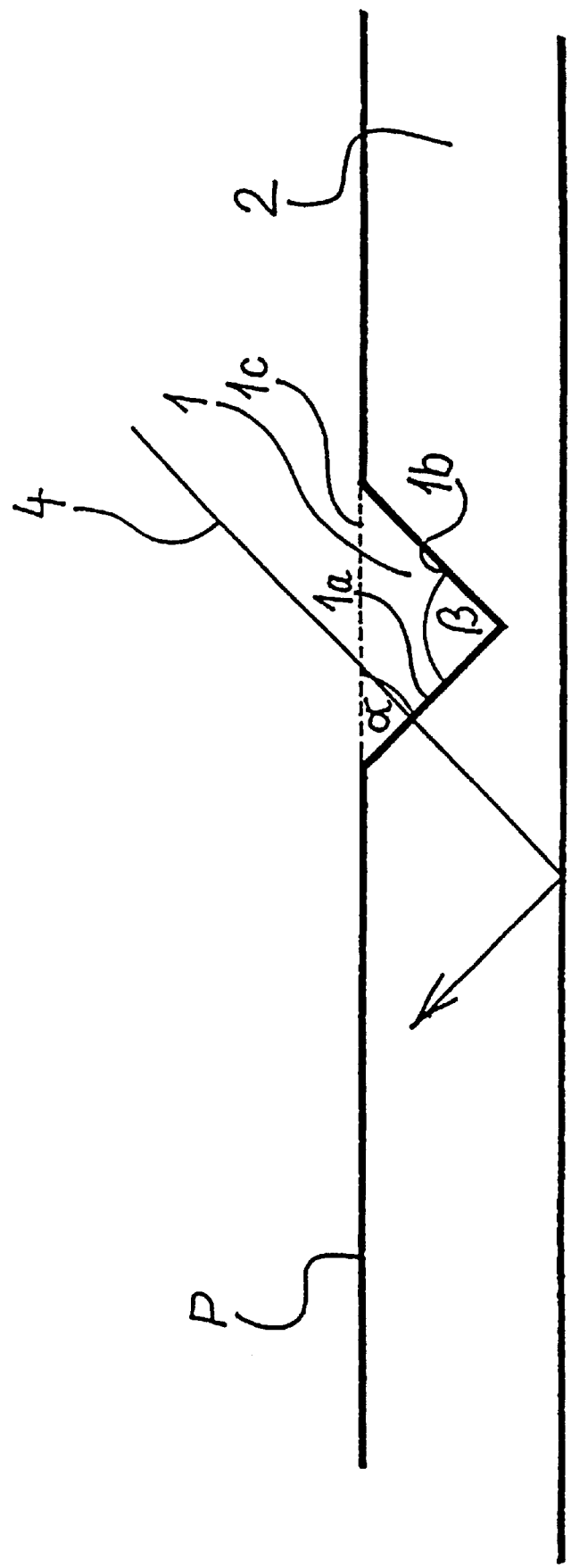
FIG. 5 shows an injector having input area inside of a light conductor.

Light optical system according to the example in FIG. 5 shows the basic arrangement of optical injector 1 on light conductor 2 where the input area 1a, secondary area 1b, angle α between the main surface P and light conductor 2 input area 1a are shown. Input area 1a of the injector 1 projects inwards the conductor 2. Light ray 4 enters the conductor 2 through the injector 1 input area 1a and continues in the total reflection mode in the conductor 2. The advantage of this arrangement of the injector 1 is that once it is created it does not need to maintain the properties of the joint of the conductor 2 and the previous variant of the injector 1 that was placed on the conductor 2 additionally. The advantage of this version of the injector 1 is zero space requirement.

Figure 6:
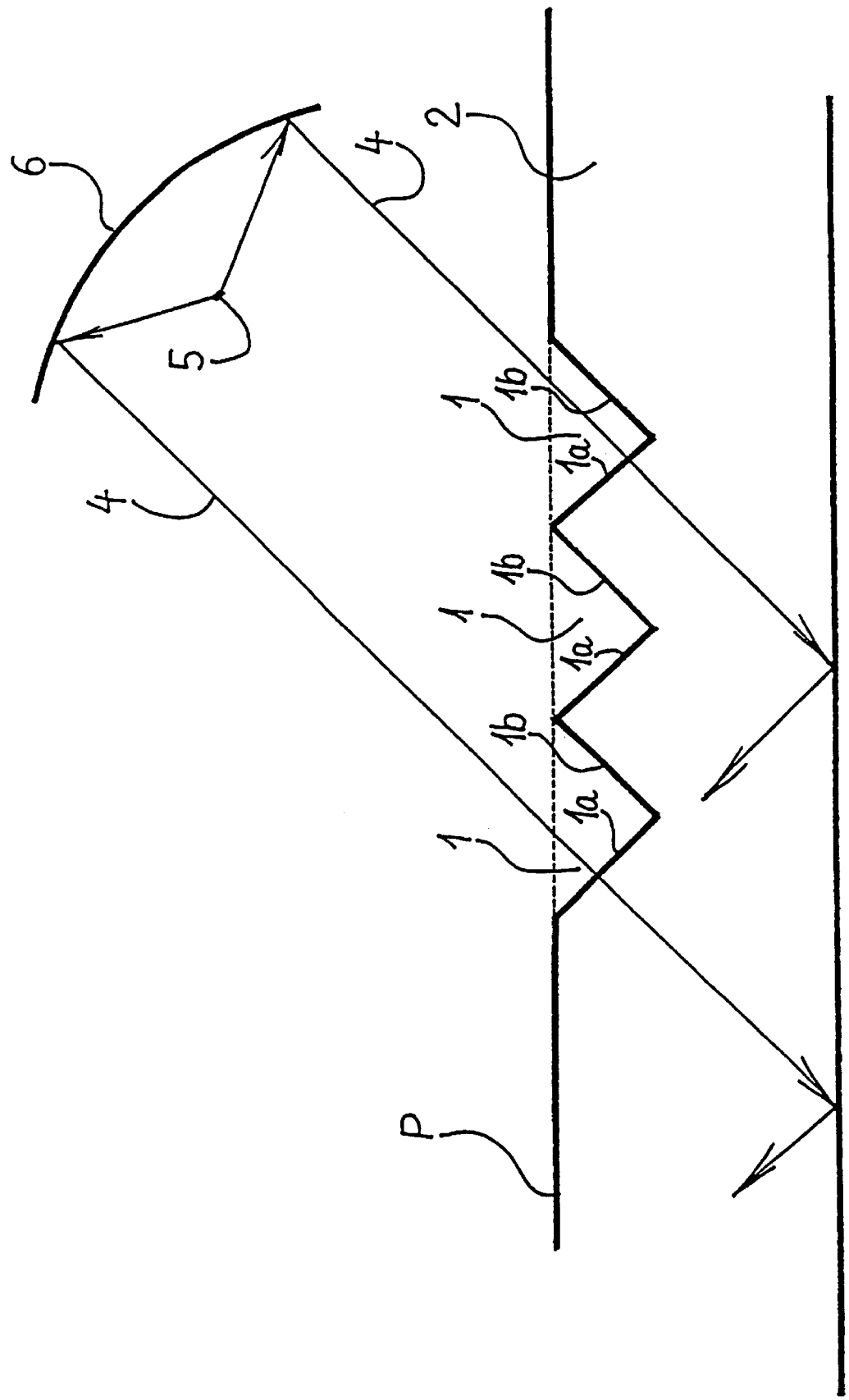
FIG. 6 shows an injector multiple realisation.

In FIG. 6 the injector 1 is merged into the conductor 2 as a system of three input areas 1a and of three secondary areas 1b in the main surface P. The system consists of the light source 5, reflector 6, from which the ray 4 outputs that enters the conductor 2 through the input area 1a of the conductor 1. Input area of the injector 1 projects inwards the conductor 2. In this arrangement, areas 1a are perpendicular to the direction of rays 4. This need not be always. The refraction can be used here and the change of the direction of the light ray 4 after entering the conductor through the interface air/conductor 2 if the ray is not perpendicular to the interface area. Thus, α and β input angles can be adjusted in an advantageous way of the injector 1 input area 1a and secondary 1b area, respectively, so that the injector 1 can catch the light beam 4 as wide as possible and to transfer it into the conductor 2. In this arrangement, the angle of the light beam 4 with respect to the main surface area can be bigger than the limit angle for total reflection inside of conductor 2, which results in bigger possible width of the light beam 4 and higher energy transferred into the conductor 2.

Figure 7:
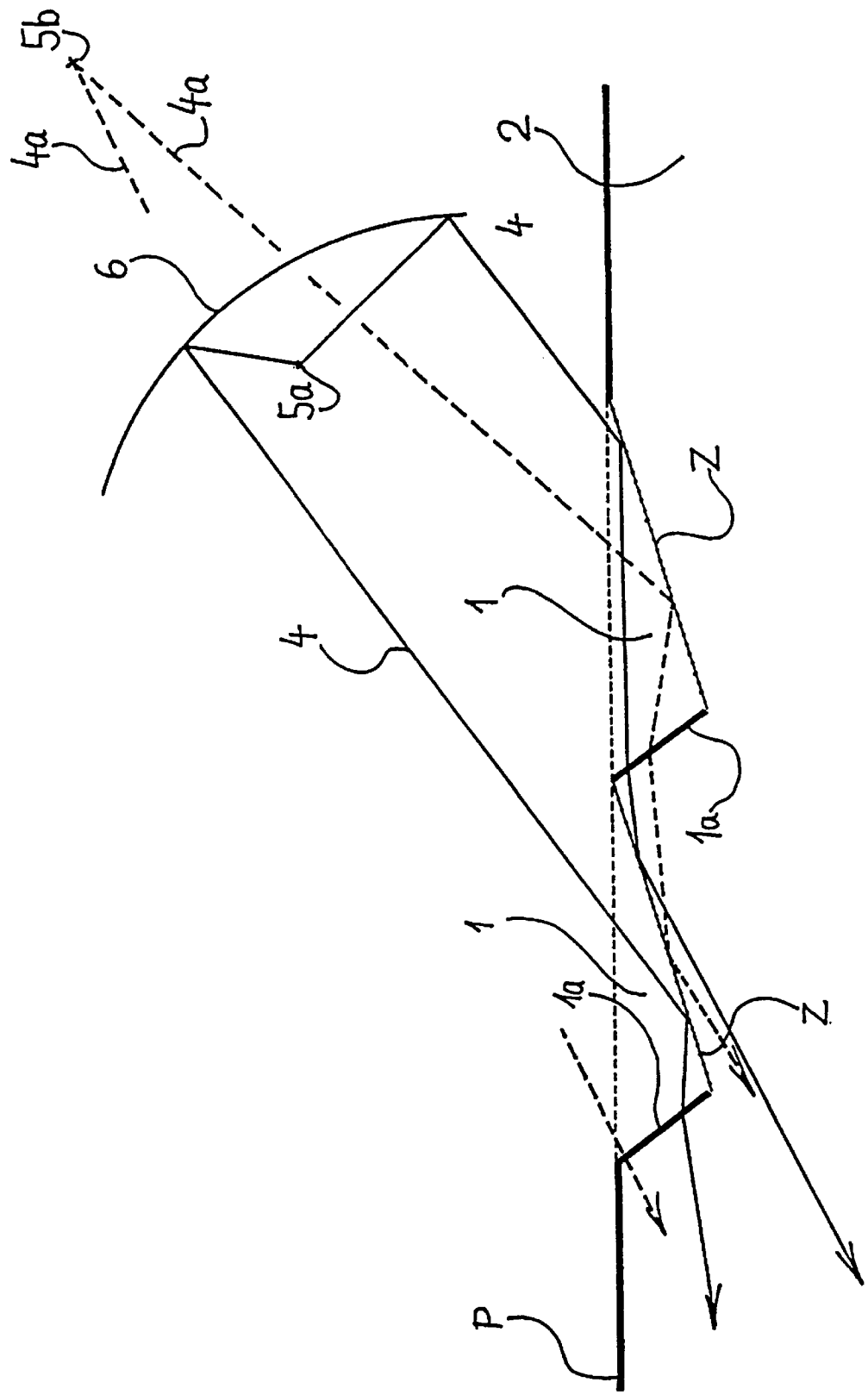
FIG. 7 shows an injector furnished with mirrors at its secondary areas.

In the FIG. 7, the example of the utilisation of the injector 1 is shown that is merged into the conductor 2 in the main surface P of the conductor 2 that is furnished with mirrors Z in the secondary areas 1b, with typical light rays 4 and 4a. This implementation is advantageous where the directional harmony does not exist of the secondary areas 1b of the injector 1 and light ray 4, e.g. in case of light sources 5b with divergent light beam 4a.

It is favourable to use an optical injector furnished with mirrors Z as of FIG. 7 in case of parallel light beam 4 produced by the source 5 equipped with a reflector 6 having bigger angle of the ray 4 with respect to the main surface P than the angle is of secondary area/s 1b of the injector 1 and main surface P. This arrangement makes it possible to use wider light beam 4 than in case of FIG. 1. The mirrors Z turn beams 4 into the conductor 2 and modify the directions of some rays 4, 4a that already have entered the conductor 2 in an advantageous way.

Figure 8:
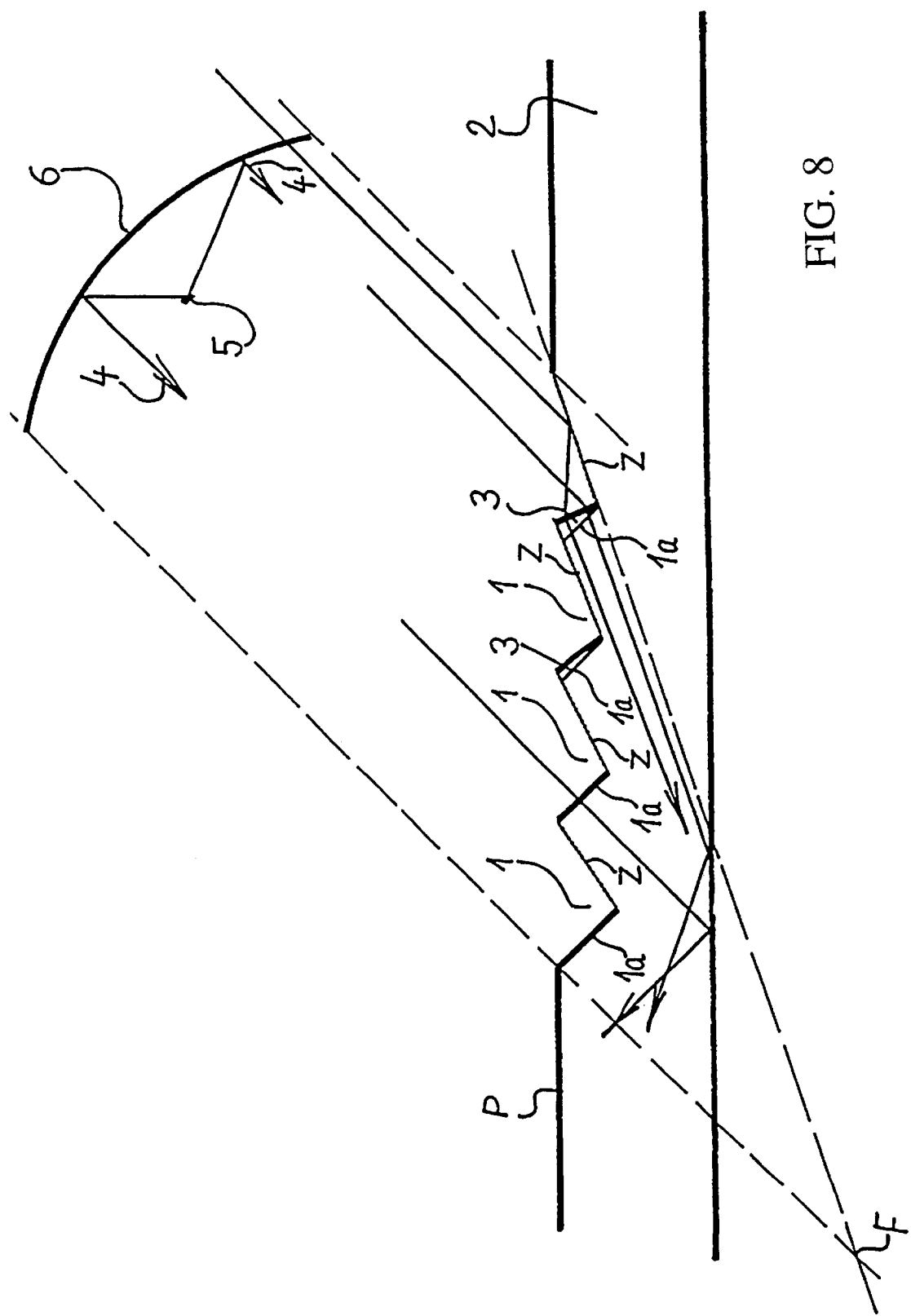
FIG. 8 shows an injector that is furnished with optical elements at its input areas beside mirrors at its secondary areas.

In FIG. 8, the example of the utilisation of the injector 1 is shown where convex optical elements 3 are used connected to its input area/s 1a. Out of the set of possible arrangements of individual focuses F, that one is shown with the conjoint focus F of individual convex optical elements 3. The system consists of light source 5 with reflector 6, and of light conductor 2. The secondary areas 1b of the injector 1 are here furnished with two-sided mirrors Z.

It is possible to enlarge favourably the area of the injector 1 in the main surface P of the conductor 2 through using optical elements 3. The convex optical element 3 used here changes the direction of light rays 4 and thus the reflection of rays 4 does not occur inside of conductor 2 from one input area 1a of the injector 1 to another area 1b of the optical injector 1 where the light ray 4 would leave the system in an undesirable way. The optical element 3 for this purpose can be realised by the shape of the input area 1a of injector that need not be necessarily planar, which relates to all types of injectors 1.

This possibility of enlarging the area of the optical injector 1 as shown in FIG. 8 is of advantage in case of thin light conductors 2 where only a small width of the injector 1 area is available. The mirrors Z in secondary areas 1b turn beams 4 into the conductor 2 and modify the directions of some rays 4 that already have entered the conductor 2 in an advantageous way.

Figure 9:
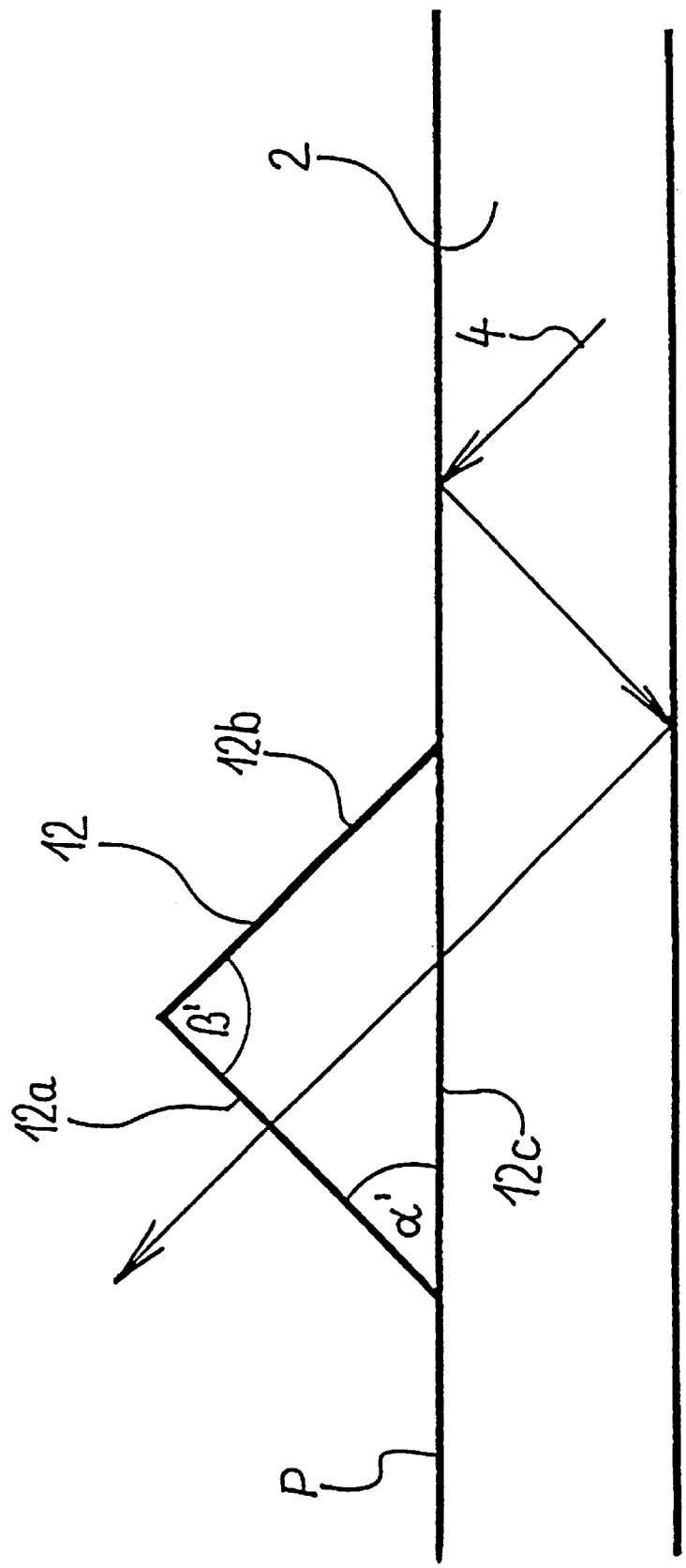
FIG. 9 shows the optical emiter at the main surface of the light conductor.

FIG. 9 shows emiter 12 in the main surface P of light conductor 2. In this case, the light conductor 2 is equipped with emiter 12 of lightguiding, material having refraction index higher than that of the air. It is of advantage when this index is near or even higher than refraction index of the light conductor 2. In this arrangement, output area 12a of the emiter 12 is perpendicular to the axis of the light beam getting out of the light conductor 2, which is not an obligatory condition. The purpose of the emiter 12 is to enable light beam 4 output out of the light conductor 2. The purpose of using such a system is can be e.g. inserting the projection light beam into the light conductor 2 for a part of its path or using the fixed light conductor 2 in a similar way in illumination devices. Emiter 12 is arranged similarly as the injector 1 but rays 4 go through it in the direction light conductor 2—emiter 12—environment.

If an optical element is added that can effectively change the directional arrangement of the output beam 4, it is possible to intentionally shape the output beam 4 with respect to the requirements regarding the target area. An example of its utilisation can be lighting of a shop window directly from the glass pane in the position of its front side. Seen by an outside viewer, the shop window is lighted inside without using a visible light source and without shadows. Another possible application area is the field of design and that of manufacturing illuminators and devices.

Emiter 12 can be attached to the light conductor 2 subsequently or it can be made together with the light conductor 2 as its physical component.

Figure 10:
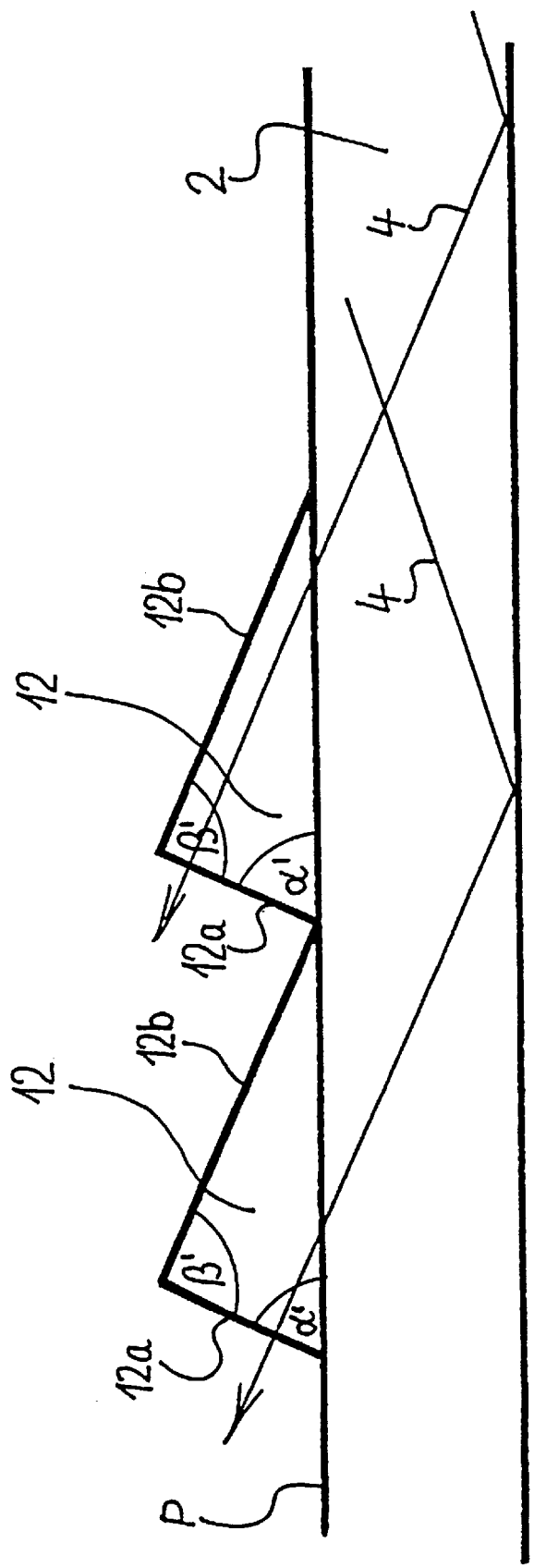
FIG. 10 shows the optical emiter in a multiple realisation.

FIG. 10 shows a set of emiters 12 in the main surface P. The advantage is lower space requirement.

Figure 11:
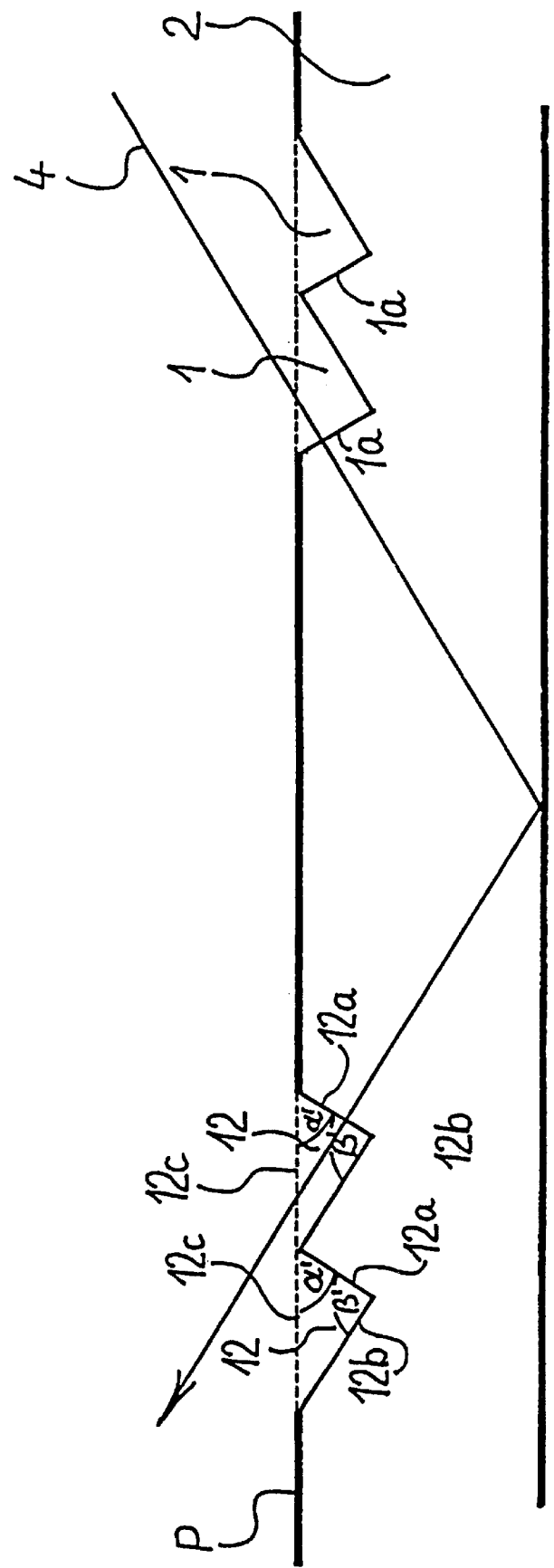
FIG. 11 shows the optical emiter together with an injector as merged into a light conductor in a multiple realisation.

In FIG. 11, the set of emiters 12 is located on the conductor 2 with the injector 1. Light travels along the conductor in this configuration and leaves the system that is compact and does not require maintenance.

Figure 12:
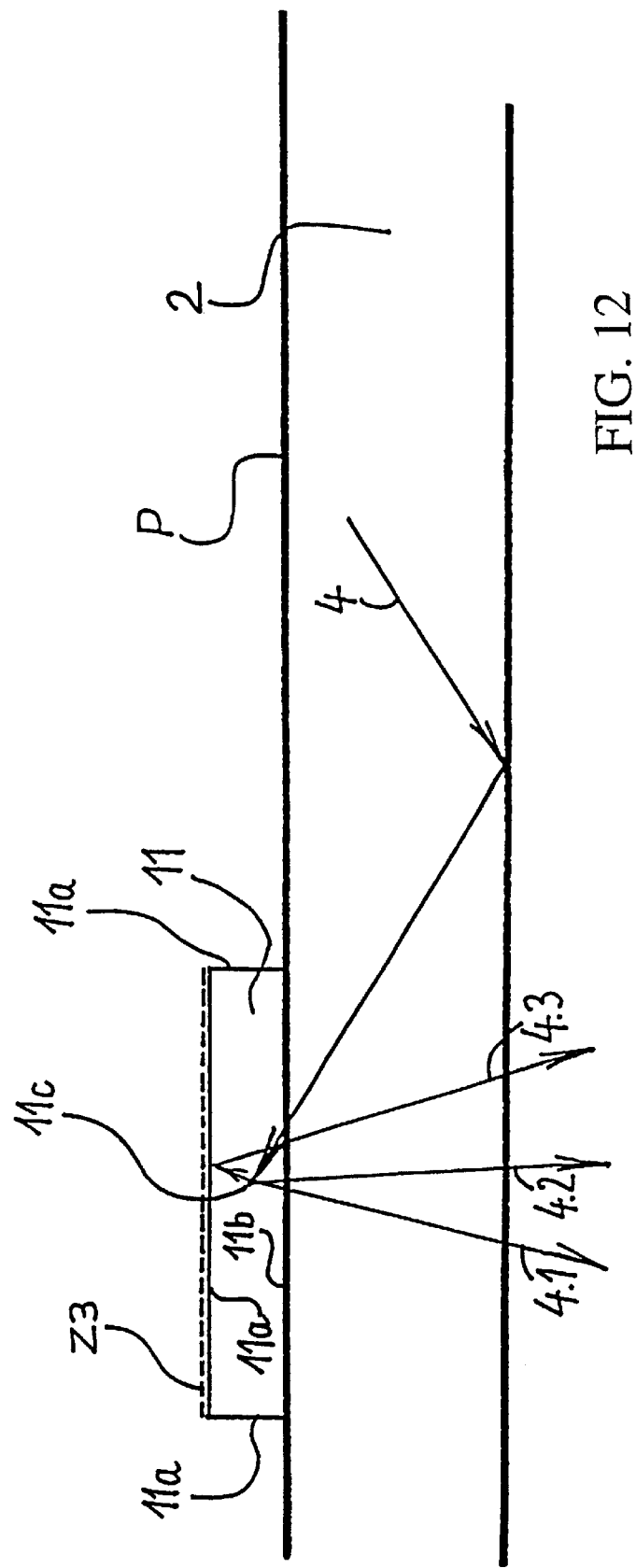
FIG. 12 shows an emiter with a reflecting-diffusive zone.

FIG. 12 shows a favourable arrangement of emiter 11 with a reflecting-diffusive area 11c. This type of emiter 11 can be attached to the conductor additionally. In the arrangement according to FIG. 12, the light conductor 2 is equipped with one emiter 41. The emiter 11 is located in that area of the light conductor 2 which the guided light beam 4 goes through. The emiter 11 is made of lightguiding material having refraction index higher than that of the air. It is connected with the conductor 2 through an optically homogeneous joint. Individual reflecting-diffusive areas 11c are scattered inside of the emiter 11. The beam 4 was invisible for a viewer before, as a result of the light beam arrangement before diffusion. After diffusion, some one of the light rays gets off to the viewer from every spot of the emiter 11 containing reflecting-diffusive area. The sum of them carries information. The advantage of this emiter is its easy application and possibility of exchange by means of e.g. self-sticking foil.

FIG. 12 shows an emiter with a light emission through one side of a light conductor the emiter being provided on an output area 11a with a mirror Z3. The emiter 11 in an implementation without the mirror Z3 shows the light emission through all the directions. The intensity of the emission in particular portions of the emiter 11 may be controlled by varying the thickness of the body of the emiter 11 and providing the emiter 11 with variable complex of the reflecting-diffusive areas 11c.

The emiter 11 may even form a fill of a cavity in a interior portion of the light to conductor 2. The emiter 11 may be linked to the conductor 2 additionally or it may be produced together with the light conductor as part and parcel thereof.

Figure 13:
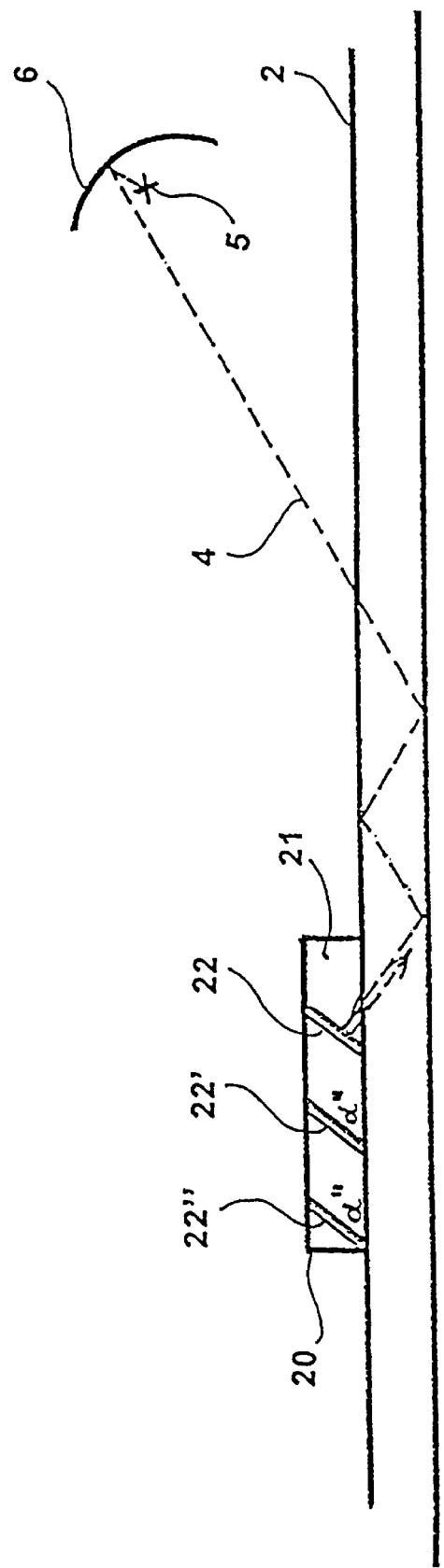
FIG. 13 shows a reversing zone at the main surface of the light conductor.

FIG. 13 shows an example of possible arrangement of reversing zone 20. Reversing zone 20 consists of a body 21 made of material having refraction index that is near to that of the light conductor 2, and it is connected to the main surface P of the light conductor 2 through an optically homogeneous joint. The body 21 of the reversing zone 20 contains at least one reflecting surface. In the example shown, there is the set of three reflecting surfaces 22, 22', 22".

If possible and needed, the reflecting surfaces 22, 22', 22" are reflecting from the side of light source 5, at the same time possibly transparent for the rays 4 coming to the target area from the opposite direction, i.e. from the reflecting surface 22" that is the most distant one from the target area.

In the picture, planar reflecting surfaces 22, 22', 22" are adjusted to be perpendicular to the axis of the impacting light beam 4 so that most of the reflected rays aimed back to the target area. In case of the light beam 4 that does not contain majority of parallel rays 4 it is advantageous to adjust the first reflecting surface 22 to be perpendicular to the most steep component of the light beam 4 and to turn the other reflecting surfaces 22', 22" subsequently in the direction perpendicular to more and more flat component of the light beam 4. The advantage of using the reversing zone 20 is preventing loss of light in the system where the rays 4 that did not hit the target area at the first attempt would leave the system without any effect. The reversing zone 20 returns these rays 4 back and they are exploited then, which increases system efficiency considerably.

Figure 14:
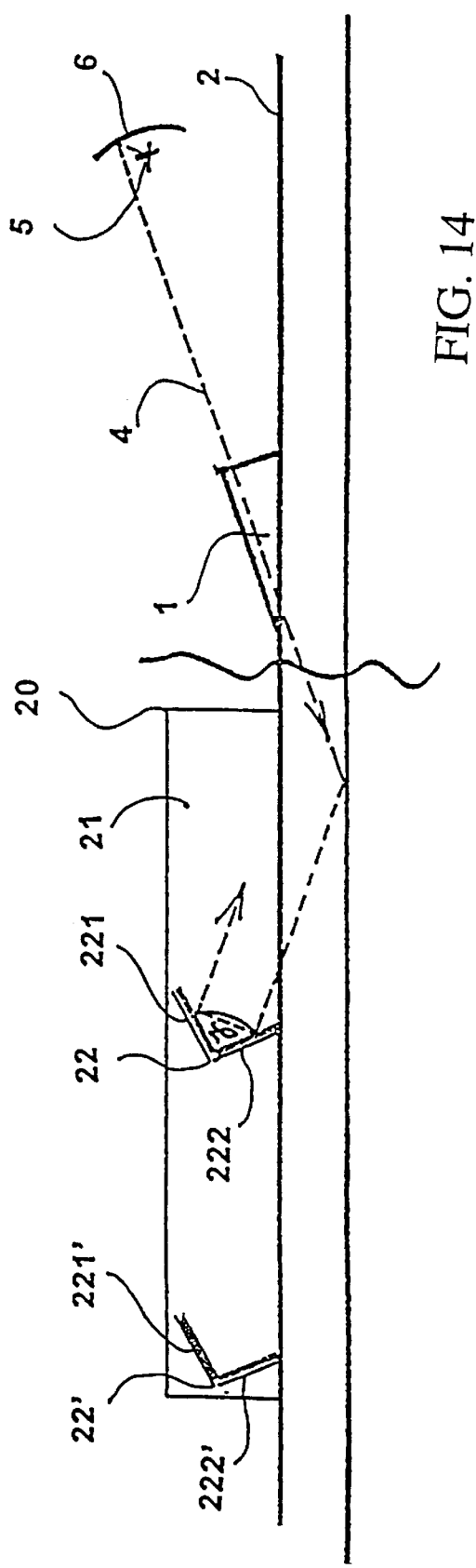
FIG. 14 shows a reversing zone having reflecting surface composed of two mirrors.

Another possibility as shown in FIG. 14 is to equip the reversing zone 20 by at least one reflecting surface 22 consisting of a pair of mirrors 221 and 222 intersecting under angle γ (75°–105°) wherein the direction of angle γ axis is identical with the axis direction of the impacting light beam 4. Such a pair of mirrors 221, 222 reflects the impacting ray back irrespective of the angle under which the ray impacted at the mirror set, at the plane perpendicular to both mirrors 221, 222. As already mentioned, directions of the axis of angle between mirrors 221 and 222 and that of light beam 4 can differ up to the position where the axis of the light beam 4 is in parallel to the plane of any of both mirrors 221, 222. In the example shown, two reflecting surfaces are indicated, first of them 22 consisting of the pair of mirrors 221 and 222, second of them 22' consisting of the pair of mirrors 221' and 222'.

Another possibility of reflecting surfaces arrangement in the reversing zone 20 is to equip the reversing zone 20 with at least one reflecting surface 22 consisting of three mirrors 221, 222, 223 mutually perpendicular so that their reflecting sides reflected to the same section of the common space, i.e. towards the light source 5 of the light beam 4 where the axis of the light beam 4 impacting at mirrors 221, 222, 223 is in parallel to some of the straight lines lying inside the angle among the mirrors 221, 222, 223 and going through the vertex of this angle. Such a set of mirrors is called corner reflector. An example with several corner reflectors is shown in the FIG. 15 where the light conductor 2 is completed with the injector 1 again. FIG. 15a shows the sight at the mirrors 221, 222, 223 of the corner reflector-22 from above, FIG. 15b that from aside. Directions of the axis of corner reflector and that of light beam 4 can differ up to the position where the axis of the light beam 4 is in parallel to the plane of any of mirrors 221, 222. 223. Such a system reflects an impacting ray back in the same direction, irrespective of the angle under which the ray impacted at the mirror set. In the arrangement of reflecting surfaces according to FIG. 14 and FIG. 15, the adjustment of the angle of reflecting surface 22 with respect to the direction of light rays 4 is not critical and the system is efficient irrespective of beam nature.

Figure 16:
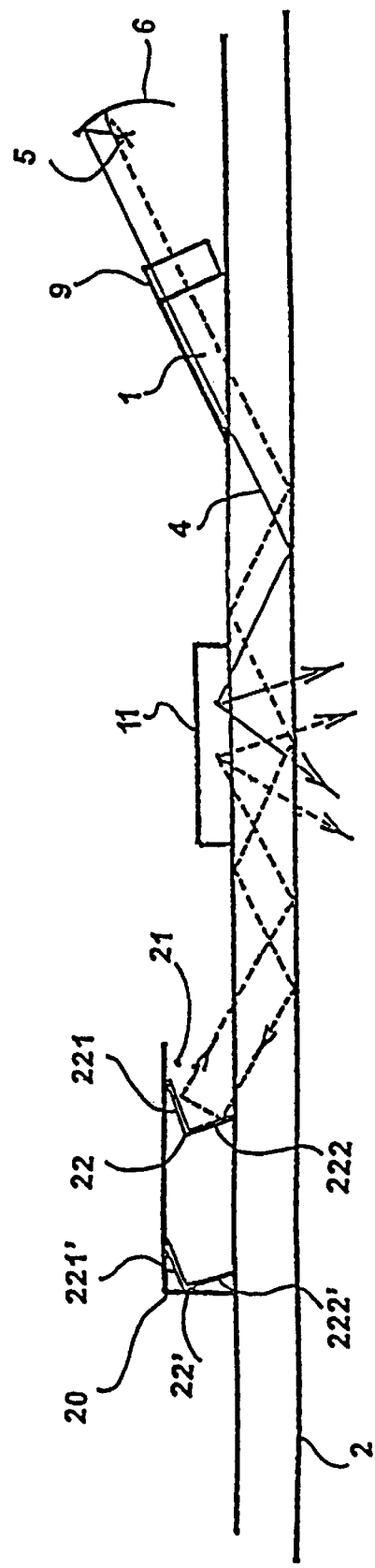
FIG. 16 shows a system composed of a source furnished with a reflector, an injector with lightguide, reflecting-diffusive emiter and reversing zone at the light conductor.

FIG. 16 illustrates increasing of efficiency through reversing zone 20 in the optical system with light source 5 that is equipped with reflector 6, lightguide 9, injector 1, emiter 11 and reversing zone 22. The light ray hits the emiter 11 in the first case, misses it in the second case and hits it again after change of direction in the reversing zone 20

Figure 17:
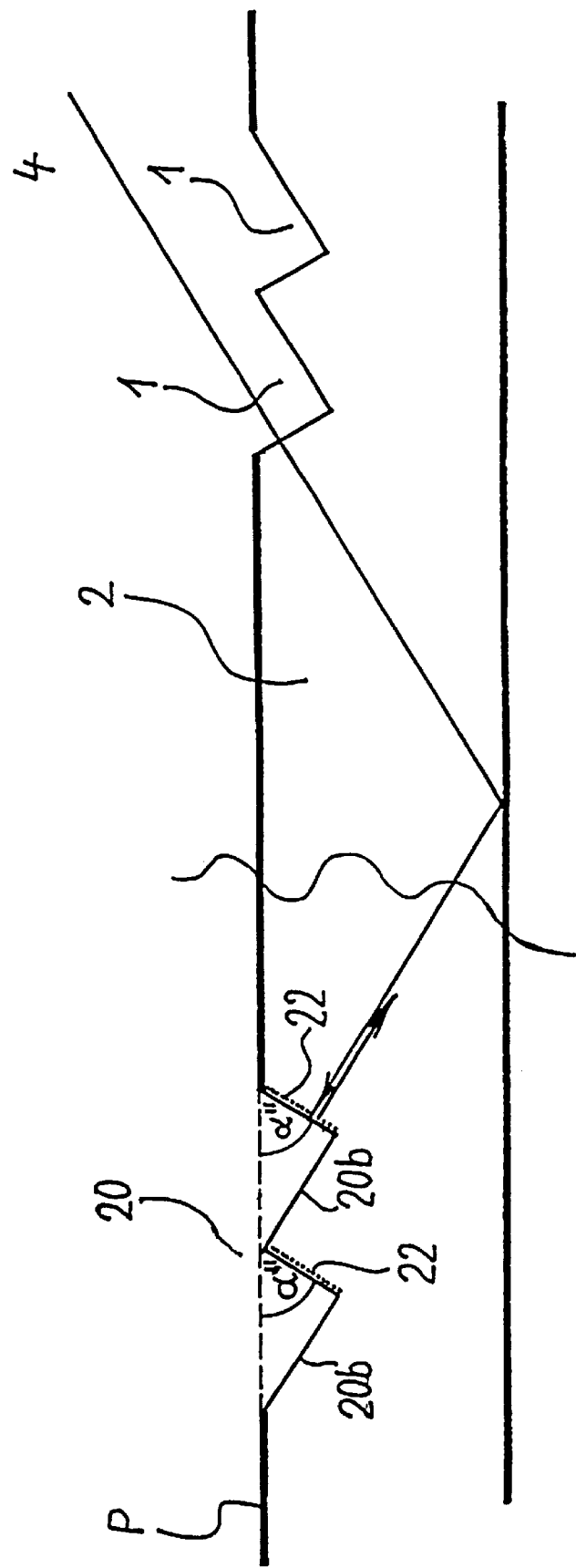
FIG. 17 shows an injector system merged into the light conductor, together with a reversing zone merged into the light conductor.

FIG. 17 shows an optical injector 1 and reversing zone 20 with reflecting surface 22 that are located in the main surface P of the light conductor 2. There is a non-displayed target area within the interruption of the conductor 2, where the majority of light rays 4 turn to, eventually. The advantage of this arrangement is the system spatial optimisation. In addition, it does not require supplementary care for connection quality as it is in case of external, additionally attached optical elements.

Figure 18:
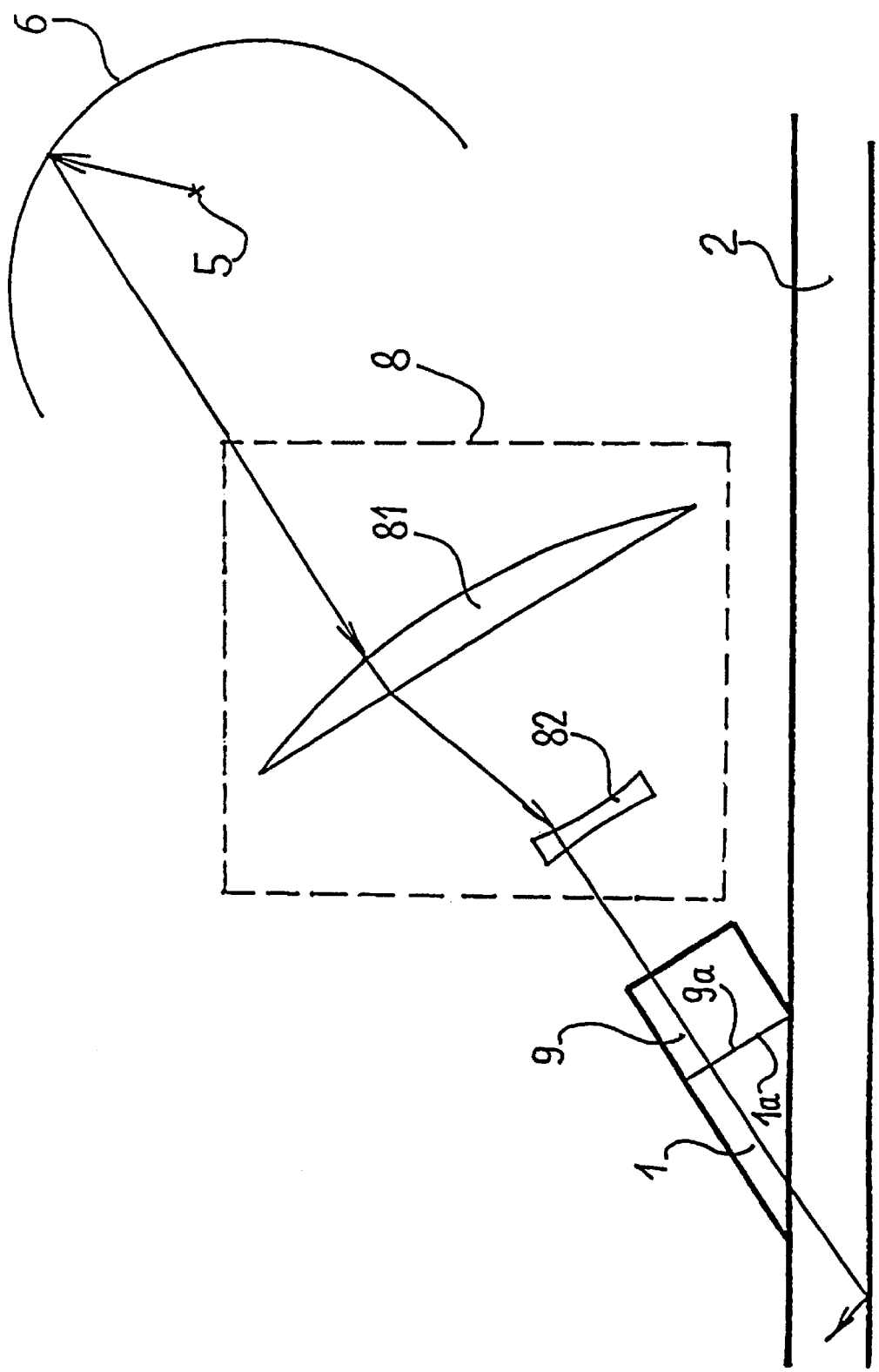
FIG. 18 shows a system composed of a source furnished with a reflector, a compression element and an injector with lightguide.

There is a compression element B, conductor 2, injector 1, and light source 5 equipped with parabolic reflector 6, in the FIG. 18. The light beam having majority of parallel rays gets out of the system: source 5, reflector 6, and after being compressed in compression element 8, it enters injector 1 and conductor 2 through lightguide 9. The compression element 8 consists of convex lens 82 and concave lens 81. The compression element 8 brings the advantage of possibility to use light source of bigger dimensions than the side dimension of the conductor 2 is, or bigger than the dimension of the injector 1 is. The lightguide 9 connecting the light source 5, compression element 8 and injector 1 brings the advantage of possibility to place the light source 5 with reflector 6 anywhere outside of the light conductor 2. The system of light source 5, reflector 6 and compression element 8 can be placed movably so that light ray 4 can pass through individual areas of the emiter 11 having the resulting dynamical effect.

Figure 19:
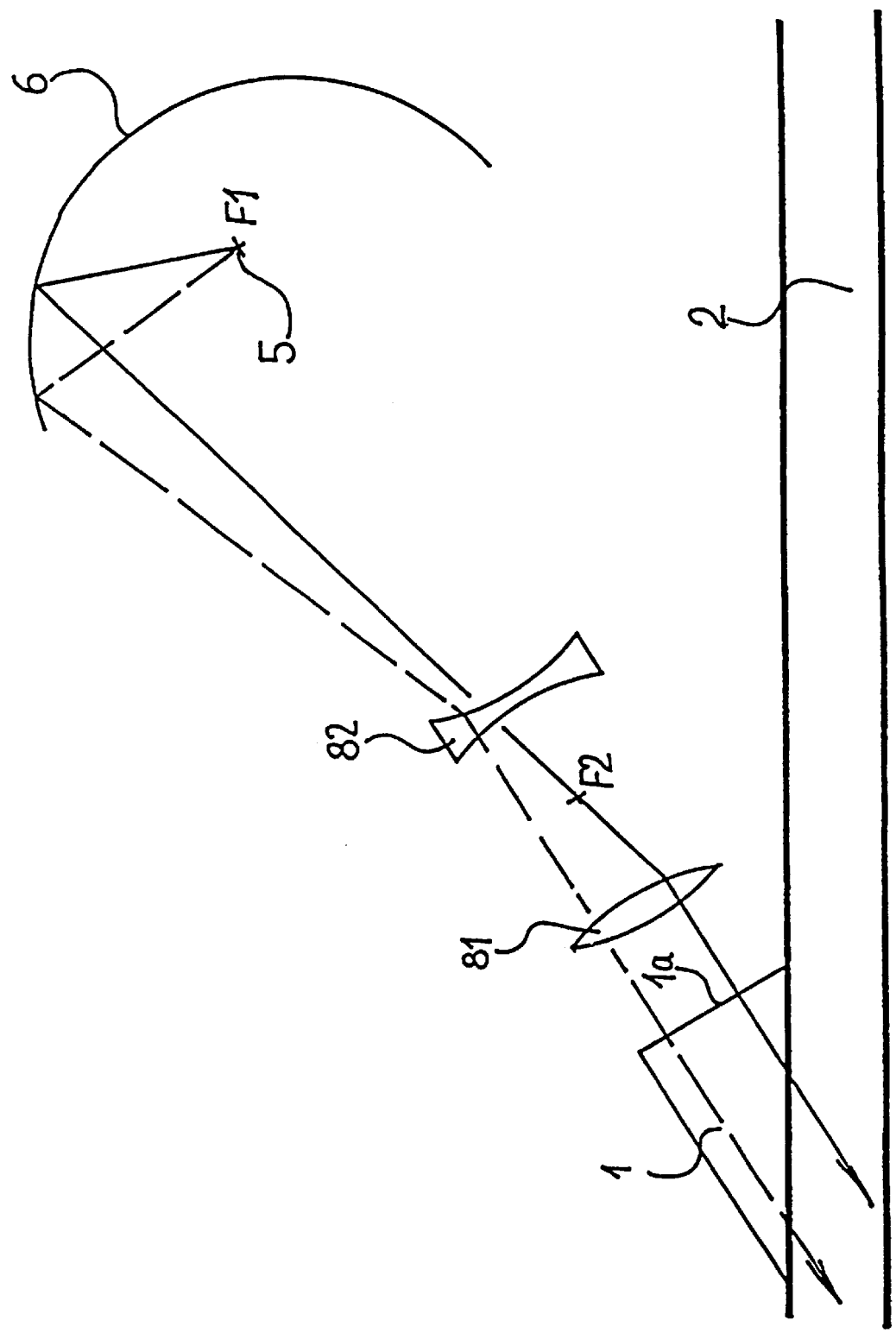
FIG. 19 shows a source furnished with an elliptic reflector, and a compression element composed of one convex or concave lens and an injector.

FIG. 19 shows the system of source 5, reflector 6 and compression element 8 that consists of one optical element, further injector 1 and conductor 2. The advantage of using an elliptical reflector is the concentration of light beam without the need to use a convex optical element 81 which is not used here.

Figure 20:
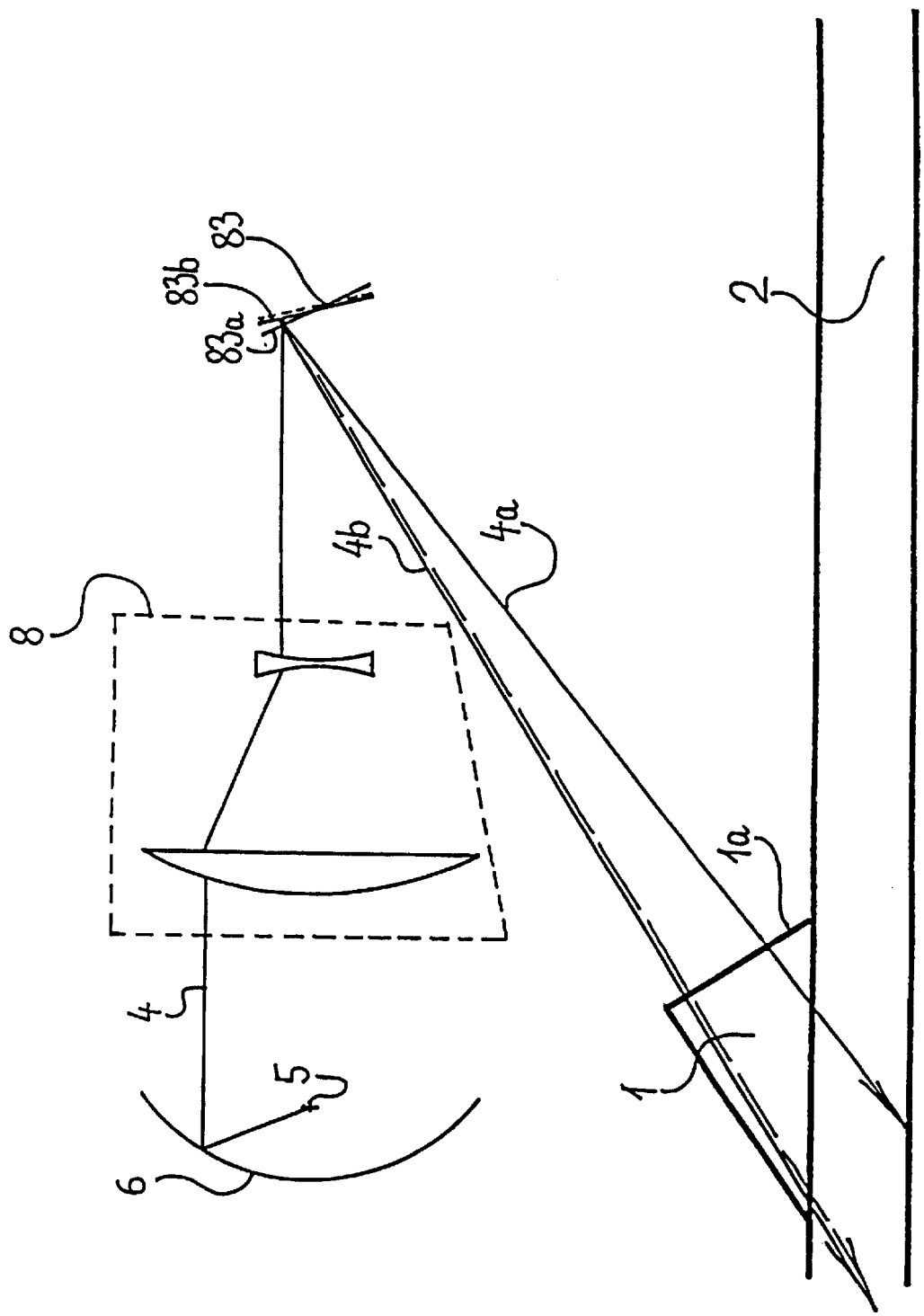
FIG. 20 shows a system composed of a light source furnished with a reflector, a compression element, an injector and a movable mirror for moving the light beam in the target area and for the dynamic effect resulting thereof.

FIG. 20 shows a similar system where a movable mirror 83 is inserted between injector 1 and compression element 8 by means of which the light beam 4 is purposely deflected in order that a dynamic light effect originated in the target area.

Figure 21:
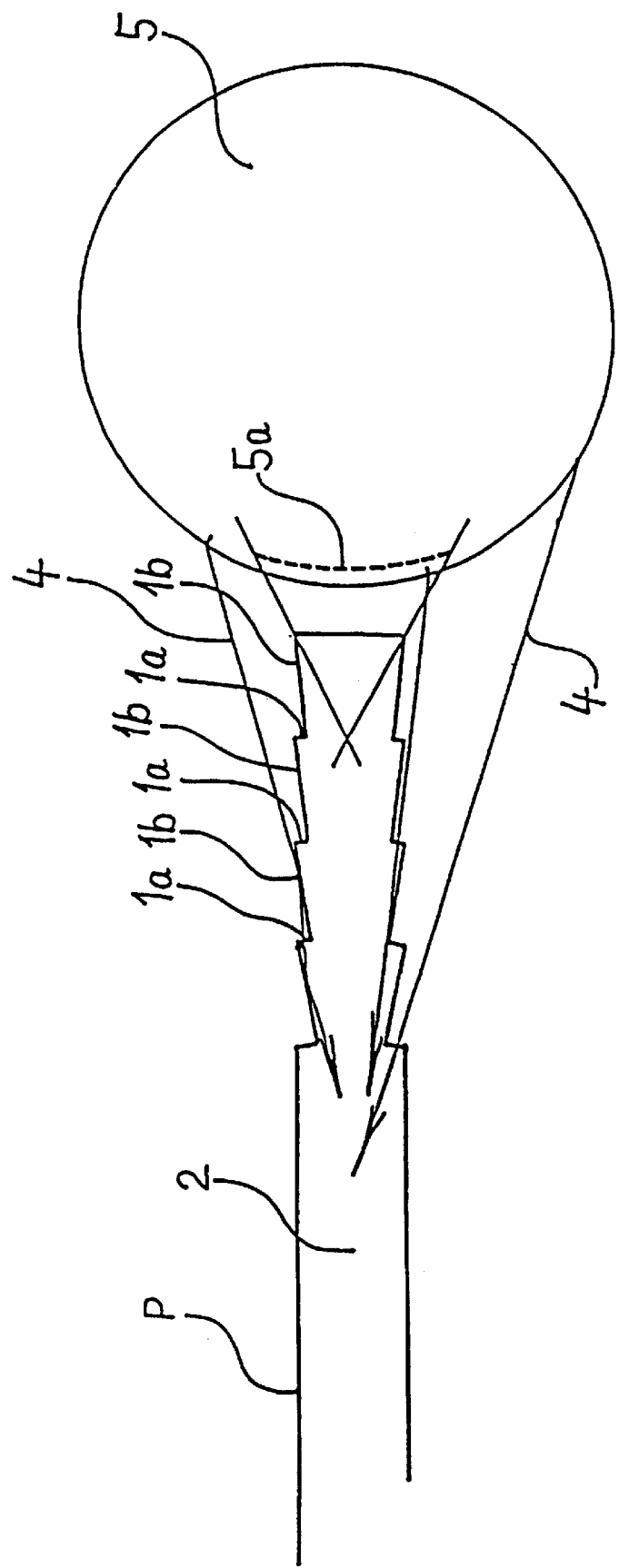
FIG. 21 shows an injector that bounds on the side rim of a light conductor.

There is a pair of injectors 1 in the FIG. 21 bounding on the side of the light conductor 2 connected to the light source 5, e.g. fluorescent tube 5 that is placed against the side rim of conductor 2. This arrangement solves the increase of efficiency of systems having light 4 input through the side rim of conductor 2 through reuse of lost rays 4 that normally do not aim directly at the side rim of conductor 2 from the source 5. Dashed line describes the part of source 5*a* that was used in system arrangements according to actual status of technology. This area is limited by input aperture of the conductor 2 side rim. In the new arrangement, light beams 4 from the whole source 5 enter the conductor 2. Input area 1*a* and secondary areas 1*b* of the injector 1 is shown the same way as above.

Figure 22:
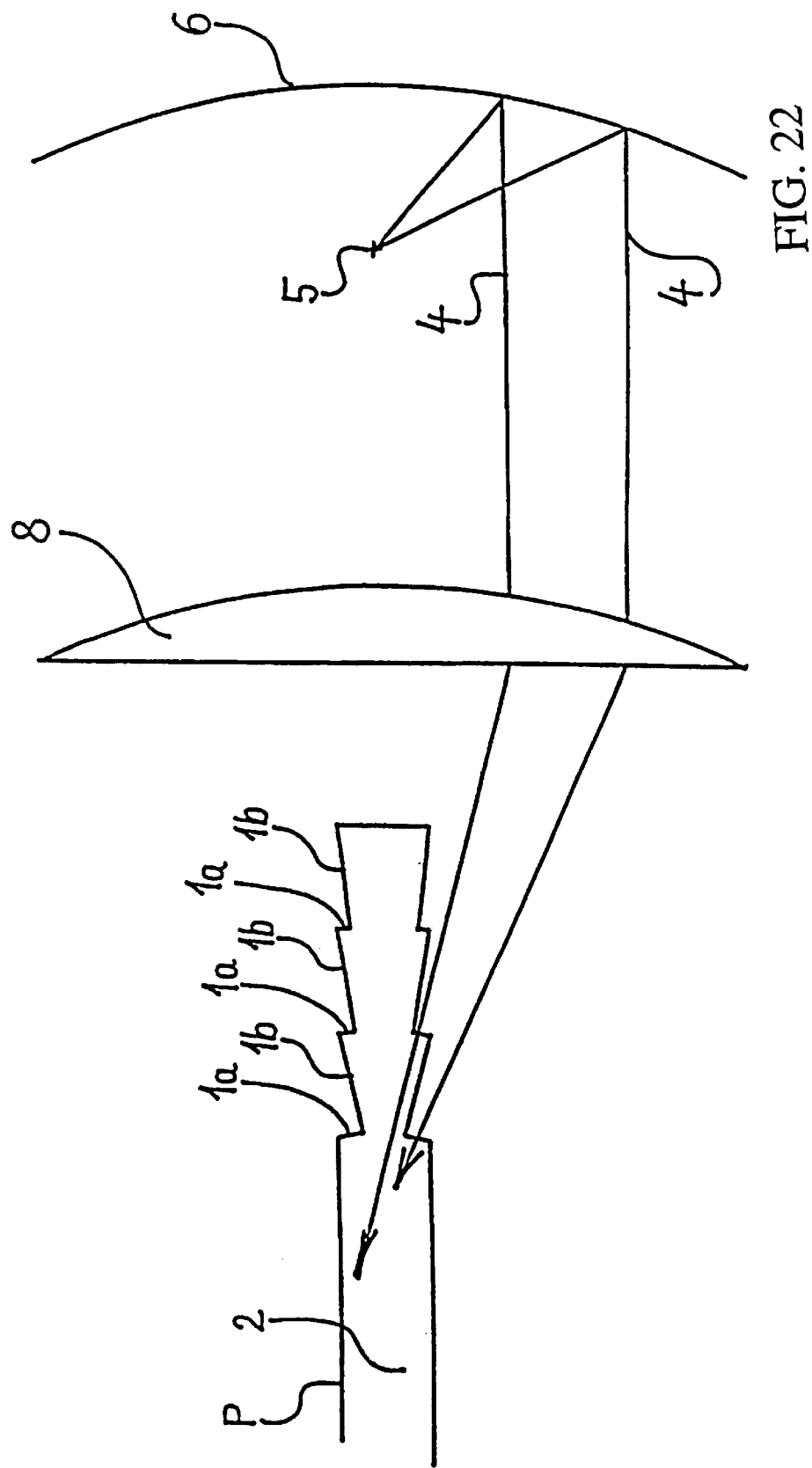
FIG. 22 shows an injector that bounds on the side rim of a light conductor, with a compression element.

There is a pair of injectors 1 in the FIG. 22 bounding on the side of the light conductor 2 connected to light source 5 that is equipped with a reflector 6 and a compression element 8. Using the combination of the compression element 8 and injector 1, several times higher share of light beams 4 from source 5 contributes to the intended effect than it has been in the systems used so far.

Figure 23:
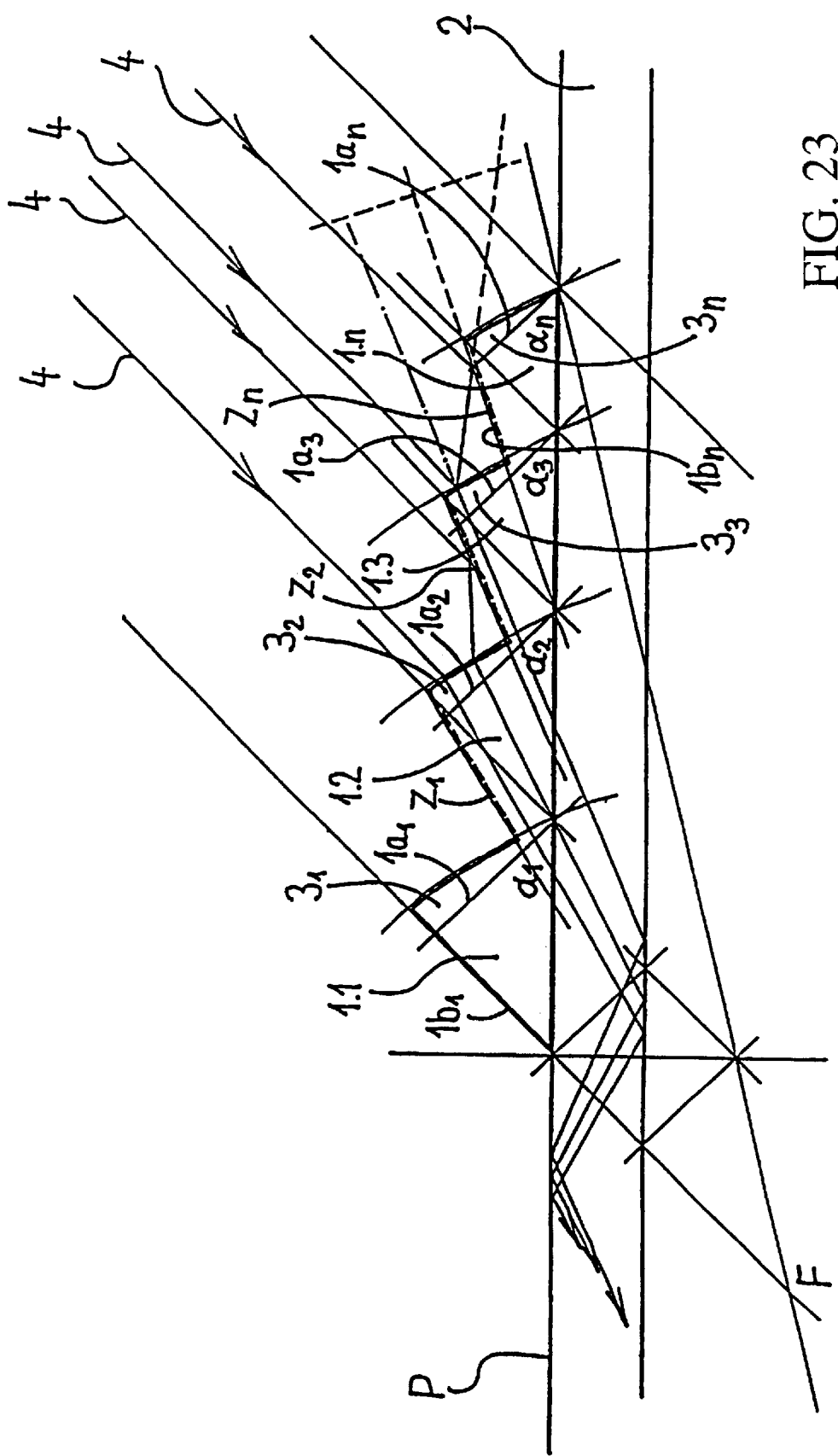
FIG. 23 shows a system of several injectors linked together with optical elements and mirrors.

The injector in FIG. 23 consists of series of individual injectors $1_1$ through $1_n$, that continually follow each other and the individual input areas of which $1a_1$ through $1a_n$ are equipped with optical elements $3_1$ through $3_n$. The connections 1*b* of neighbouring input areas are equipped with mirrors $Z_1$ through $Z_n$. In the favourable arrangement, all input frontal areas $1_1$ through $1_n$ have a common focus point F. The advantage of this arrangement is high efficiency by reason that most rays 4 from the source enter the conductor 2 in case both of parallel and divergent beams similarly to FIG. 8.

Figure 24:
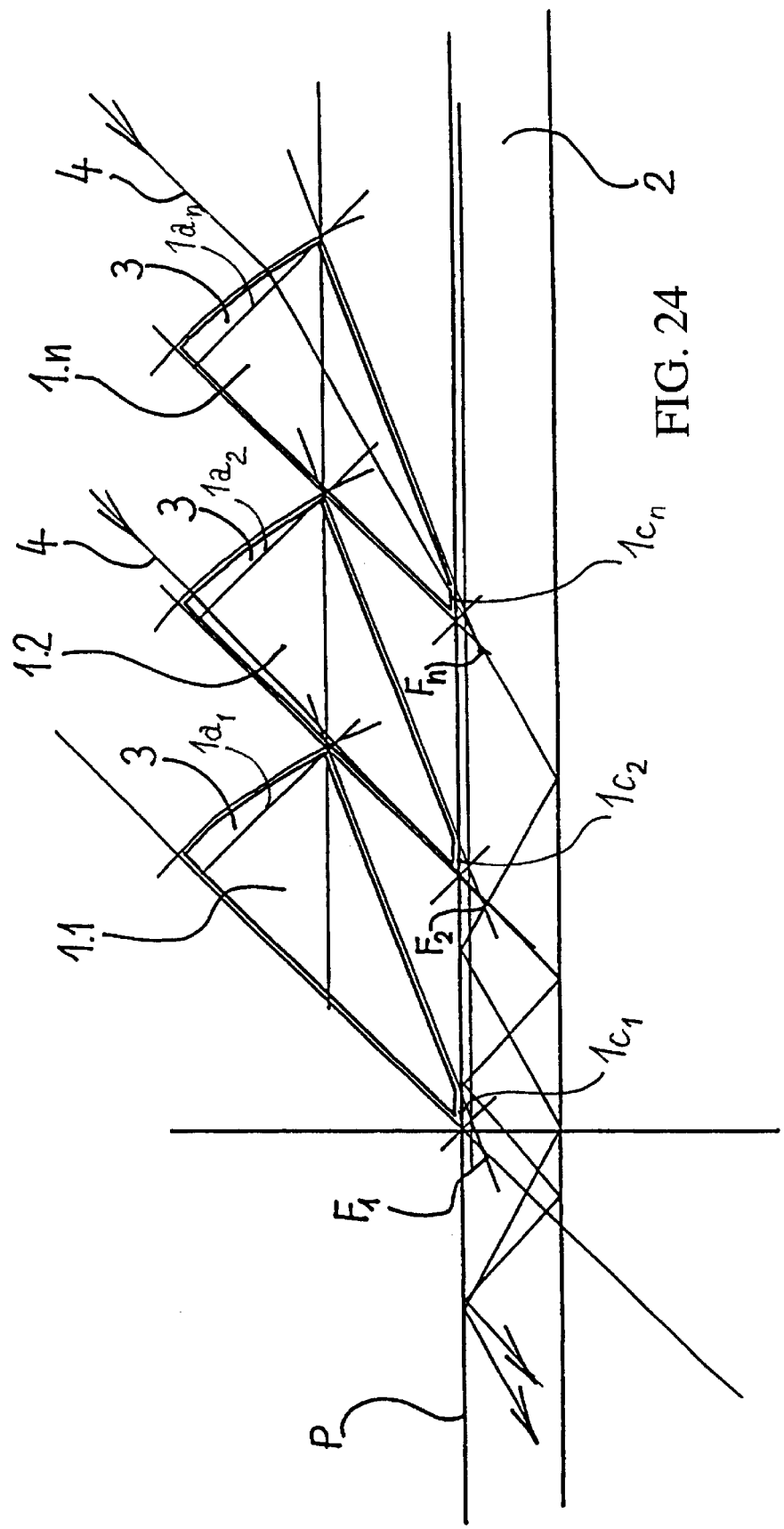
FIG. 24 shows a system of several individual injectors with optical elements.

In FIG. 24, the injector in the main surface P consists of the set of individual injectors $1_1$, $1_2$, $1_n$ placed so that the ratio of the sum of input areas $1a_1$, $1a_2$, $1a_n$ to the sum of basic areas $1c_1$, $1c_2$, $1c_n$ of individual injectors $1_1$, $1_2$, $1_n$ to the sum of interfaces between individual injectors $1_1$, $1_2$, $1_n$ and the light conductor 2 were as high as possible. In this case injectors $1_1$, $1_2$, $1_n$ are equipped with optical elements $3_1$, $3_2$, $3_n$ and each of these optical elements $3_1$, $3_2$, $3_n$ has its own focus $F_1$, $F_2$, $F_n$ wherein these focuses lie inside of the light conductor 2, namely as near as possible to the input interface between injectors $1_1$, $1_2$, $1_n$ and the light conductor 2. The advantage of this arrangement is that the area of the injector is not limited and it is possible to deliver unlimited amount of light into the conductor.

Figure 25:
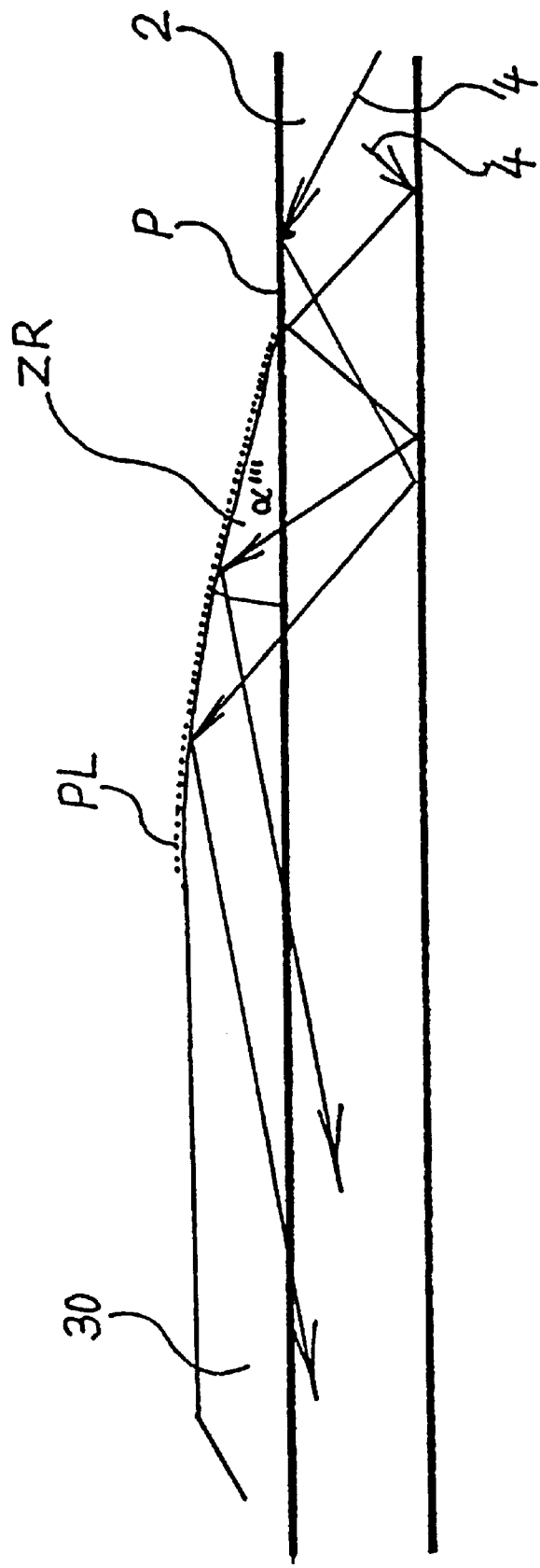
FIG. 25 shows a reflecting element that bounds on the main surface of the light conductor.

In the FIG. 25, there is shown the reflector element 30 as located in the main surface P of the light conductor 2 that consists of at least one area PL reflecting light rays 4 in the direction to conductor 2 and that projects out of the main surface P under the angle $\alpha'''$ of 0° to 45° between area PL and the main surface P and is gradually flecting in the direction to the light conductor 2 main surface. In the favourable arrangement the area L is equipped with the mirror ZR. The body of the reflector element 30 is made of lightguiding material and attached to the light conductor 2 by means of optically homogeneous joint. The advantage of connecting the reflector element 30 into the system between light input into the conductor, e.g. injector 1, and the target area, e.g. that of emiter 11, is decreasing the value of angle between the conductor 2 axis and individual light rays 4 progressing along the conductor 2, which is advantageous in cases when the beam with rays 4 having angle near to total reflection, i.e. approx. 45°. These steep rays 4 do not get far enough into the space of large target area of emiter 11. They hit only its peripheral area. By attaching the reflector element 30, the beam rays 4 are less steep and thus penetrate farther into the target area 11 which is then illuminated uniformly.

The reflector element may be preferably used also in the case of uneven or flexible light conductors, where an escape of light beam out from the light conductor occurs as consequence of the opening of the angle between particular beams of the light beam when this one passed a curve of the light conductor. So, the reflector element enables to clench the light beam to the end that the light beam fulfil again the condition of the total reflection.

What is claimed is:

1. An illuminator for illuminating a planar light conductor with a light source, the planar light conductor having a first surface and a second surface and a transparent body therebetween, comprising:

a) an injector comprising a wedge-shaped body made of transparent material having a refractive index higher than air, having an input side and an adjoining output side in contact with the first surface of the planar light conductor at an optical interface, the optical interface between the injector and the light conductor being optically homogeneous;

b) a light guide located in an optical path between the light source and the input side of the injector, such that light is guided by the lightguide from the light source to the injector;

the light source, light guide and injector being situated such that light output from the light source enters the light guide, and is guided to enter the injector through the input side and is conducted into the planar light conductor through the optically homogeneous optical interface, and is distributed through the planar light conductor by internal reflection within the body of the planar light conductor.

2. The illuminator of claim 1, in which the body of the planar light conductor has a refractive index, and the refractive index of the body of the injector is near the refractive index of the body of the planar light conductor.

3. The illuminator of claim 1, in which the body of the planar light conductor has a refractive index, and the refractive index of the body of the injector is equal to the refractive index of the body of the planar light conductor.

4. The illuminator of claim 1, further comprising a reversing element attached to a surface of the planar light conductor at an optically homogeneous interface, so that light introduced into the planar light conductor by the light source through the injector leaves the planar light conductor through the optically homogeneous interface between the reversing element and the surface, and the light is then reflected by the reversing element, re-entering the planar light conductor through the optically homogeneous interface between the reversing element and the surface, enhancing the illumination of the planar light conductor.

5. The illuminator of claim 4 in which the reversing element comprises a transparent body made of material a having an index of refraction near that of the planar light conductor and at least one reflecting surface.

6. The illuminator of claim 5 in which the reflecting surface projects out of the surface of the planar light conductor at an angle between 0° and 90°.

7. The illuminator of claim 5 in which there are a plurality of reflecting surfaces (22).

8. The illuminator of claim 7 in which the plurality of reflecting surfaces comprises a pair of mirrors intersecting at an angle between 75° and 105°.

9. The illuminator of claim 7 in which the plurality of reflecting surfaces comprises a corner reflector comprising a triplet of mutually perpendicular mirrors.

10. The illuminator of claim 4 in which the reflecting surface is semi-permeable to light, so that it reflects the rays coming from the light source and is simultaneously permeable to the rays aiming at the light source.

11. An illuminated display comprising:

a) a light source;

b) a planar light conductor having a first surface and a second surface and a transparent body therebetween;

c) an injector comprising a wedge-shaped body made of transparent material having a refractive index higher than air, having an input side and an adjoining output side in contact with the first surface of the planar light conductor at an optical interface, the optical interface between the injector and the light conductor being optically homogeneous;

d) a light guide located in an optical path between the light source and the input side of the injector, such that light is guided by the lightguide from the light source to the injector;

the light source, light guide and injector being situated such that light output from the light source enters the light guide, and is guided to enter the injector through the input side and is conducted into the planar light conductor through the optically homogeneous optical interface, and is distributed through the planar light conductor by internal reflection within the body of the planar light conductor.

12. The illuminated display of claim 11, in which the body of the planar light conductor has a refractive index, and the refractive index of the body of the injector is higher than the refractive index of the body of the planar light conductor.

13. The illuminated display of claim 11, in which the body of the planar light conductor has a refractive index, and the refractive index of the body of the injector is equal to the refractive index of the body of the planar light conductor.

14. The illuminated display of claim 11, further comprising at least one emitter, attached to a surface of the planar light conductor at an optically homogeneous interface, so that light introduced into the planar light conductor by the light source through the injector leaves the planar light conductor through the optically homogeneous interface between the emitter and the surface, and illuminates the emitter, making the emitter visible through the planar light conductor to a viewer on an opposite side of the planar light conductor from the emitter.

15. The illuminated display of claim 11, further comprising a reversing element attached to a surface of the planar light conductor at an optically homogeneous interface, so that light introduced into the planar light conductor by the light source through the injector leaves the planar light conductor through the optically homogeneous interface between the reversing element and the surface, and the light is then reflected by the reversing element, re-entering the planar light conductor through the optically homogeneous interface between the reversing element and the surface, enhancing the illumination of the display.

16. The illuminated display of claim 15 in which the reversing element comprises a transparent body made of material a having an index of refraction near that of the planar light conductor and at least one reflecting surface.

17. The illuminated display of claim 16 in which the reflecting surface projects out of the surface of the planar light conductor at an angle between 0° and 90°.

18. The illuminated display of claim 16 in which there are a plurality of reflecting surfaces.

19. The illuminated display of claim 18, in which the plurality of reflecting surfaces comprises a pair of mirrors intersecting at an angle between 75° and 105°.

20. The illuminated display of claim 18 in which the plurality of reflecting surfaces comprises a corner reflector comprising a triplet of mutually perpendicular mirrors.

21. The illuminated display of claim 15 in which the reflecting surface is semi-permeable to light, so that it reflects the rays coming from the light source and is simultaneously permeable to the rays aiming at the light source.

22. A method of illuminating a planar light conductor having a first surface and a second surface and a transparent body therebetween with a light source, comprising the steps of:

attaching an injector comprising a wedge-shaped body made of transparent material having a refractive index higher than air to the first surface of the planar light conductor, forming an optically homogeneous optical interface, the input side of the injector being shaped such that light entering the injector through the input side is brought into focus at a point inside the planar light conductor or behind it;

directing light from the light source into the injector using a light guide, such that light output from the light source is guided into the injector by the light guide and is conducted into the planar light conductor through the optically homogeneous optical interface, and is distributed through the planar light conductor by internal reflection within the body of the planar light conductor.

23. The method of claim 22, further comprising the step of attaching a reversing element to a surface of the planar light conductor, forming an optically homogeneous interface, so that light introduced into the planar light conductor by the light source through the injector leaves the planar light conductor through the optically homogeneous interface between the reversing element and the surface, and the light is then reflected by the reversing element, re-entering the planar light conductor through the optically homogeneous interface between the reversing element and the surface, enhancing the illumination of the planar light conductor.

24. A method of illuminating a sign attached to a surface of a window, comprising the steps of:

attaching an injector comprising a wedge-shaped body made of transparent material having a refractive index higher than air to a surface of the window, forming an optically homogeneous optical interface, the input side of the injector being shaped such that light entering the injector through the input side is brought into focus at a point inside the window or behind it;

directing light from a light source into the injector using a light guide such that light output from the light source is guided into the injector by the light guide and is conducted into the window through the optically homogeneous optical interface, and is distributed through the window by internal reflection, illuminating the sign attached to the surface of the window.

25. The method of claim 24, further comprising the step of attaching a reversing element to a surface of the window, forming an optically homogeneous interface, so that light introduced into the window by the light source through the injector leaves the window through the optically homogeneous interface between the reversing element and the surface, and the light is then reflected by the reversing element, re-entering the window through the optically homogeneous interface between the reversing element and the surface, enhancing the illumination of the sign.

* * * * *